(12) United States Patent
Wen et al.

(10) Patent No.: US 11,297,523 B2
(45) Date of Patent: Apr. 5, 2022

(54) MEASUREMENT METHOD AND MEASUREMENT APPARATUS

(71) Applicant: HUAWEI TECHNOLOGIES CO., LTD., Shenzhen (CN)

(72) Inventors: Hui Wen, Beijing (CN); Ning Dong, Beijing (CN); Jingjun Chen, Beijing (CN); Xiaofu Geng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/937,717

(22) Filed: Jul. 24, 2020

(65) Prior Publication Data

US 2020/0367086 A1   Nov. 19, 2020

Related U.S. Application Data

(63) Continuation of application No. PCT/CN2019/072670, filed on Jan. 22, 2019.

(30) Foreign Application Priority Data

Jan. 30, 2018   (CN) .......................... 201810091241.X

(51) Int. Cl.
  *H04W 24/10* (2009.01)
  *H04B 17/318* (2015.01)
  (Continued)

(52) U.S. Cl.
  CPC .......... *H04W 24/10* (2013.01); *H04B 17/318* (2015.01); *H04W 72/085* (2013.01); *H04W 76/27* (2018.02)

(58) Field of Classification Search
  CPC ... H04W 24/10; H04W 76/27; H04W 72/085; H04B 17/318
  (Continued)

(56) References Cited

U.S. PATENT DOCUMENTS

2016/0227427 A1* 8/2016 Vajapeyam ........... H04L 5/0048
2017/0085326 A1   3/2017 Li et al.
(Continued)

FOREIGN PATENT DOCUMENTS

CN   105307190 A   2/2016
CN   105580415 A   5/2016
(Continued)

OTHER PUBLICATIONS

Huawei, HiSilicon: "Discussion on Inter-frequency RSSI measurement requirements in LAA," 3GPP TSG RAN WG4 Meeting #81, R4-1610115, Reno, Nevada, USA, Nov. 14-18, 2016, total 2 pages.
(Continued)

*Primary Examiner* — Mong-Thuy T Tran
(74) *Attorney, Agent, or Firm* — Maier & Maier, PLLC

(57) ABSTRACT

Embodiments of this application disclose a measurement method and a measurement apparatus, to perform RMTC measurement and DMTC measurement on an inter-frequency frequency. The method in the embodiments of this application includes: determining an idle component carrier; determining a RMTC measurement periodicity and a DMTC measurement periodicity of a first inter-frequency frequency for LAA; when the RMTC measurement periodicity and the DMTC measurement periodicity of the first inter-frequency frequency have a same time point, separately performing RMTC measurement on the first inter-frequency frequency by using the idle component carrier to obtain a first measurement result, and performing DMTC measurement on the first inter-frequency frequency to obtain a second measurement result; and sending the first measurement result and the second measurement result to a network device, where the first measurement result and the second measurement result are used to indicate the network device to schedule a resource.

10 Claims, 10 Drawing Sheets

(51) Int. Cl.
*H04W 76/27* (2018.01)
*H04W 72/08* (2009.01)

(58) Field of Classification Search
USPC .......................................................... 370/329
See application file for complete search history.

(56) References Cited

U.S. PATENT DOCUMENTS

| | | | |
|---|---|---|---|
| 2017/0093542 A1 | 3/2017 | Li et al. | |
| 2017/0094543 A1* | 3/2017 | Narasimha | H04W 16/14 |
| 2017/0359817 A1 | 12/2017 | Wittenmark et al. | |
| 2018/0227838 A1* | 8/2018 | Hayashi | H04W 72/042 |
| 2018/0324620 A1* | 11/2018 | Harada | H04W 24/10 |
| 2019/0007147 A1* | 1/2019 | Li | H04B 17/318 |
| 2019/0230580 A1* | 7/2019 | Kim | H04W 74/0833 |
| 2019/0364469 A1* | 11/2019 | Siomina | H04W 72/0453 |

FOREIGN PATENT DOCUMENTS

| | | |
|---|---|---|
| CN | 105792217 A | 7/2016 |
| CN | 105916171 A | 8/2016 |
| CN | 106559830 A | 4/2017 |
| CN | 107534499 A | 1/2018 |
| CN | 107534963 A | 1/2018 |
| CN | 107624253 A | 1/2018 |
| WO | 2017135297 A1 | 8/2017 |

OTHER PUBLICATIONS

Nokia: "LAA/WiFi hardware sharing problem", 3GPP TSG-RAN WG4 Meeting #84bis, R4-1711371, Dubrovnik, Croatia, Oct. 9-13, 2017, total 3 pages.
Intel Corporation: "On measurement requirement for LAA", 3GPP TSG-RAN WG4 Meeting #82, R4-1700676, Athens, Greece, Feb. 13-17, 2017, total 3 pages.
3GPP TS 36.133 V15.1.0, 3rd Generation Partnership Project; Technical Specification Group Radio Access Network; Evolved Universal Terrestrial Radio Access (E-UTRA); Requirements for support of radio resource management (Release 15), Dec. 2017, total 2994 pages.
3GPP TS 36.331 V15.0.1, 3rd Generation Partnership Project; Technical Specification Group Radio Access Network; Evolved Universal Terrestrial Radio Access (E-UTRA); Radio Resource Control (RRC); Protocol specification (Release 15), Jan. 2018, total 776 pages.

* cited by examiner

MEASUREMENT METHOD AND MEASUREMENT APPARATUS

CROSS-REFERENCE TO RELATED APPLICATIONS

This application is a continuation of International Application No. PCT/CN2019/072670, filed on Jan. 22, 2019, which claims priority to Chinese Patent Application No. 201810091241.X, filed on Jan. 30, 2018. The disclosures of the aforementioned applications are hereby incorporated by reference in their entireties.

TECHNICAL FIELD

This application relates to the communications field, and in particular, to a measurement method and a measurement apparatus.

BACKGROUND

In wireless communication, licensed assisted access (LAA) is used to occupy an unlicensed wireless fidelity (Wi-Fi) frequency band (5 GHz), improve spectrum efficiency, and increase a user download rate. Operators can share a Wi-Fi frequency band to improve a network capacity, use a licensed frequency band as a primary carrier, and use an unlicensed frequency band as a secondary carrier.

Because there may be another wireless access system, for example, Wi-Fi, on the unlicensed frequency band, during LAA, a concept of received signal strength indicator (RS SI) measurement is introduced. To be specific, a terminal or user equipment (UE) directly collects, in time domain, statistics about power of an unlicensed frequency and reports the statistics about the power. The power includes power of all wireless access systems at the frequency. RSSI measurement on an unlicensed frequency is bound to the frequency. RSSI measurement can be configured for a frequency.

An RSSI measurement periodicity protocol is referred to as an RSSI measurement timing configuration (which may also be an RSSI and channel occupancy measurement timing configuration, and may be referred to as a RMTC) periodicity, which can be configured to {40, 80, 160, 320, or 640} ms. An orthogonal frequency division multiplexing (OFDM) symbol quantity protocol used for collecting statistics about RSSIs in each measurement periodicity is referred to as measurement duration of UE-report RSSI measurement, which may be configured to {1, 14, 28, 42, or 70}. A possible discovery signals measurement timing configuration (DMTC) periodicity is 40 ms, 80 ms, or 160 ms.

In the prior art, both a DMTC measurement periodicity and an RMTC measurement periodicity of each LAA frequency are relatively long. In actual applications, the two configurations coexist, and often conflict with each other. As a result, in the DMTC measurement periodicity and the RMTC measurement periodicity, some frequencies with low priorities during a conflict are not scheduled, and lose a measurement opportunity.

SUMMARY

Embodiments of this application provide a measurement method, to perform RMTC measurement and DMTC measurement on a same frequency, reduce a probability of missed measurement or re-measurement, and save system resources.

In view of this, a first aspect of the embodiments of this application provides a measurement method, and the method may include: determining an idle component carrier; determining a RMTC measurement periodicity and a DMTC measurement periodicity of a first inter-frequency frequency for LAA, where it should be noted that a time sequence of determining the idle component carrier and determining the RMTC periodicity and the DMTC periodicity of the first inter-frequency frequency for the LAA is not limited; when the RMTC measurement periodicity and the DMTC measurement periodicity of the first inter-frequency frequency share the same time point, separately performing RMTC measurement on the first inter-frequency frequency by using the idle component carrier to obtain a first measurement result, and performing DMTC measurement on the first inter-frequency frequency to obtain a second measurement result, where the RMTC measurement periodicity and the DMTC measurement periodicity of the first inter-frequency frequency each include a measurement start time point, measurement duration, and a measurement end time point, and that the RMTC measurement periodicity and the DMTC measurement periodicity of the first inter-frequency frequency share the same time point may also be understood as: the RMTC measurement periodicity and the DMTC measurement periodicity of the first inter-frequency frequency have an intersection; and then sending the first measurement result and the second measurement result to a network device, where the first measurement result and the second measurement result are used to indicate the network device to schedule a resource.

In this embodiment of this application, it should be noted that an RMTC measurement periodicity and a DMTC measurement periodicity of each inter-frequency frequency are preconfigured. Herein, when determining to measure the first inter-frequency frequency, a terminal may first determine whether the first inter-frequency frequency is a frequency for joint measurement. If the first inter-frequency frequency is a frequency for joint measurement, the terminal may determine the RMTC measurement periodicity and the DMTC measurement periodicity of the first inter-frequency frequency. The joint measurement means that both the RMTC measurement and the DMTC measurement need to be performed. The terminal may sequentially select the first inter-frequency frequency, may randomly select the first inter-frequency frequency, or may select the first inter-frequency frequency by using another selection method. This is not specifically limited herein. The idle component carrier is used herein. DMTC measurement and RMTC measurement of a same inter-frequency frequency are scheduled, so that a probability of missed measurement or re-measurement is reduced, system resources are saved, LAA measurement duration can be shortened, LAA cell discovery time can be shortened, access time can be reduced, user experience can be improved, and power consumption can also be optimized. When there are a plurality of idle component carriers, a plurality of inter-frequency frequencies may be correspondingly measured, thereby improving measurement efficiency.

Optionally, in some embodiments of this application, the first measurement result may include but is not limited to the following information: RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the second measurement result may include but is not limited to the following information: channel information, and the channel information is used to indicate the network device to determine scheduling data and a serving cell. In this embodiment of this application, information included in the first measurement result and the second measurement result and corresponding functions are separately described, so that the technical solution of this application is more specific, and integrity of the solution is improved.

Optionally, in some embodiments of this application, the first inter-frequency frequency carries a specific identifier, and before the determining an idle component carrier, the method may further include: when radio resource control (RRC) configures inter-frequency DMTC measurement, if the configured first inter-frequency frequency is in a first RMTC measurement list, adding the specific identifier to the first inter-frequency frequency in the first RMTC measurement list; or when the RRC configures inter-frequency RMTC measurement, if the configured first inter-frequency frequency is in a first DMTC measurement list, adding the specific identifier to the first inter-frequency frequency in the first DMTC measurement list.

In this embodiment of this application, the specific identifier may be a number, a letter, or the like, and is used to indicate that both the RMTC measurement and the DMTC measurement need to be performed on the first inter-frequency frequency. When measuring the first inter-frequency frequency, the terminal may first determine whether the first inter-frequency frequency carries the specific identifier. If the first inter-frequency frequency does not carry the specific identifier, the terminal does not need to perform the joint measurement on the first inter-frequency frequency. If the first inter-frequency frequency carries the specific identifier, the terminal performs the joint measurement on the first inter-frequency frequency. In this embodiment of this application, the first inter-frequency frequency is described, and only an inter-frequency frequency to which the specific identifier is added requires the joint measurement.

Optionally, for an inter-frequency frequency that requires the joint measurement, alternatively, a joint measurement table may be separately stored. When measuring the first inter-frequency frequency, the terminal may first find whether the joint measurement table stores the inter-frequency frequency. If the joint measurement table does not store the inter-frequency frequency, the terminal does not need to perform the joint measurement on the first inter-frequency frequency; or if the joint measurement table stores the inter-frequency frequency, the terminal performs the joint measurement on the first inter-frequency frequency.

Optionally, in some embodiments of this application, the first inter-frequency frequency carries the specific identifier, and after the sending the first measurement result and the second measurement result to a network device, the method may further include: when the RRC deconfigures the inter-frequency DMTC measurement, if the deconfigured first inter-frequency frequency is in the first RMTC measurement list, clearing the specific identifier from the first RMTC measurement list; and when the RRC deconfigures the inter-frequency RMTC measurement, if the deconfigured first inter-frequency frequency is in the first DMTC measurement list, clearing the specific identifier from the first DMTC measurement list. After the RMTC measurement and the DMTC measurement are performed on the first inter-frequency frequency, because the first inter-frequency frequency has been measured, the specific identifier of the first inter-frequency frequency may be cleared from the corresponding RMTC measurement list; and the specific identifier of the first inter-frequency frequency may be cleared from the corresponding DMTC measurement list. In this way, it can be ensured that a measured inter-frequency frequency does not need to be measured again, thereby saving system resources.

A second aspect of the embodiments of this application provides a measurement method, and the method may include: first determining a RMTC measurement periodicity and a DMTC measurement periodicity of a first inter-frequency frequency for LAA; performing RMTC measurement on a second inter-frequency frequency to obtain a third measurement result, when a start time of a RMTC measurement periodicity of the second inter-frequency frequency for the LAA falls within a gap; performing DMTC measurement on the second inter-frequency frequency to obtain a fourth measurement result, when a start time of a DMTC measurement periodicity of the second inter-frequency frequency for the LAA falls within the gap, where the gap is configured by a network device for a terminal, and one gap can be used for measuring only one inter-frequency frequency, and the network device may be an access network device, or may be a core network device; and after the third measurement result and the fourth measurement result are obtained, sending the third measurement result and the fourth measurement result to the network device, where the third measurement result and the fourth measurement result are used to indicate the network device to schedule a resource.

In this embodiment of this application, it should be noted that an RMTC measurement periodicity and a DMTC measurement periodicity of each inter-frequency frequency are preconfigured. Herein, when determining to measure the first inter-frequency frequency, the terminal may first determine whether the first inter-frequency frequency is a frequency for joint measurement. If the first inter-frequency frequency is a frequency for joint measurement, the terminal may determine the RMTC measurement periodicity and the DMTC measurement periodicity of the first inter-frequency frequency. The joint measurement means that both the RMTC measurement and the DMTC measurement need to be performed. The terminal may sequentially select the first inter-frequency frequency, may randomly select the first inter-frequency frequency, or may select the first inter-frequency frequency by using another selection method. This is not specifically limited herein. The gap is used herein. DMTC measurement and RMTC measurement of a same inter-frequency frequency are scheduled, so that a probability of missed measurement or re-measurement is reduced, system resources are saved, LAA measurement duration can be shortened, LAA cell discovery time can be shortened, access time can be reduced, user experience can be improved, and power consumption can also be optimized.

Optionally, in some embodiments of this application, the third measurement result may include but is not limited to the following information: RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the fourth measurement result may include but is not limited to the following information: channel information, and the channel information is used to indicate the network device to determine scheduling data and a serving cell. In this embodiment of this application, information included in the third measurement result and the fourth measurement result and corresponding functions are separately described, so that the technical solution of this application is more specific, and integrity of the solution is improved.

Optionally, in some embodiments of this application, the second inter-frequency frequency carries a specific identifier, and before the performing RMTC measurement on a second inter-frequency frequency, when a start time of a RMTC measurement periodicity of the second inter-frequency frequency for the LAA falls within a gap, the method may further include: when RRC configures inter-frequency DMTC measurement, if the configured second inter-frequency frequency is in a second RMTC measurement list, adding the specific identifier to the second inter-frequency frequency in the second RMTC measurement list; and when the RRC configures inter-frequency RMTC measurement, if the configured second inter-frequency frequency is in a second DMTC measurement list, adding the specific identifier to the second inter-frequency frequency in the second DMTC measurement list.

In this embodiment of this application, the specific identifier may be a number, a letter, or the like, and is used to indicate that both the RMTC measurement and the DMTC measurement need to be performed on the second inter-frequency frequency. In other words, for short, the joint measurement needs to be performed on the second inter-frequency frequency. When measuring the second inter-frequency frequency, the terminal may first determine whether the second inter-frequency frequency carries the specific identifier. If the second inter-frequency frequency does not carry the specific identifier, the terminal does not need to perform the joint measurement on the second inter-frequency frequency. If the second inter-frequency frequency carries the specific identifier, the terminal performs the joint measurement on the second inter-frequency frequency. In this embodiment of this application, the second inter-frequency frequency is described, and only an inter-frequency frequency to which the specific identifier is added requires the joint measurement.

Optionally, for an inter-frequency frequency that requires the joint measurement, alternatively, a joint measurement table may be separately stored. When measuring the second inter-frequency frequency, the terminal may first find whether the joint measurement table stores the inter-frequency frequency. If the joint measurement table does not store the inter-frequency frequency, the terminal does not need to perform the joint measurement on the second inter-frequency frequency; or if the joint measurement table stores the inter-frequency frequency, the terminal performs the joint measurement on the second inter-frequency frequency.

Optionally, in some embodiments of this application, the second inter-frequency frequency carries the specific identifier, and after the sending the third measurement result and the fourth measurement result to a network device, the method may further include: when the RRC deconfigures the inter-frequency DMTC measurement, if the deconfigured second inter-frequency frequency is in the second RMTC measurement list, clearing the specific identifier from the second RMTC measurement list; and when the RRC deconfigures the inter-frequency RMTC measurement, if the deconfigured second inter-frequency frequency is in the second DMTC measurement list, clearing the specific identifier from the second DMTC measurement list. After the RMTC measurement and the DMTC measurement are performed on the second inter-frequency frequency, because the second inter-frequency frequency has been measured, the specific identifier of the second inter-frequency frequency may be cleared from the corresponding RMTC measurement list; and the specific identifier of the second inter-frequency frequency may be cleared from the corresponding DMTC measurement list. In this way, it can be ensured that a measured inter-frequency frequency does not need to be measured again, thereby saving system resources.

A third aspect of the embodiments of this application provides a measurement method, and the method may include: first determining a secondary cell channel resource; determining a RMTC measurement periodicity and a DMTC measurement periodicity of a secondary cell intra-frequency frequency for LAA; when the RMTC measurement periodicity and the DMTC measurement periodicity of the secondary cell intra-frequency frequency share the same time point, performing RMTC measurement on the secondary cell intra-frequency frequency by using the secondary cell channel resource to obtain a fifth measurement result, and performing DMTC measurement on the secondary cell intra-frequency frequency by using the secondary cell channel resource, to obtain a sixth measurement result, where the RMTC measurement periodicity and the DMTC measurement periodicity of the intra-frequency frequency each include a measurement start time point, measurement duration, and a measurement end time point, and that the RMTC measurement periodicity and the DMTC measurement periodicity of the intra-frequency frequency share the same time point may also be understood as: the RMTC measurement periodicity and the DMTC measurement periodicity of the intra-frequency frequency have an intersection; and then sending the fifth measurement result and the sixth measurement result to a network device, where the fifth measurement result and the sixth measurement result are used to indicate the network device to schedule a resource.

In this embodiment of this application, it should be noted that an RMTC measurement periodicity and a DMTC measurement periodicity of each intra-frequency frequency are preconfigured. Herein, when determining to measure the intra-frequency frequency, a terminal may first determine whether the intra-frequency frequency is a frequency for joint measurement. If the intra-frequency frequency is a frequency for joint measurement, the terminal may determine the RMTC measurement periodicity and the DMTC measurement periodicity of the intra-frequency frequency. The joint measurement means that both the RMTC measurement and the DMTC measurement need to be performed. The terminal may sequentially select the intra-frequency frequency, may randomly select the intra-frequency frequency, or may select the intra-frequency frequency by using another selection method. This is not specifically limited herein. The secondary cell channel resource is used herein. DMTC measurement and RMTC measurement of a same intra-frequency frequency are scheduled, so that a probability of missed measurement or re-measurement is reduced, system resources are saved, LAA measurement duration can be shortened, LAA cell discovery time can be shortened, access time can be reduced, user experience can be improved, and power consumption can also be optimized. When there are a plurality of secondary cell channel resources, a plurality of intra-frequency frequencies may be correspondingly measured, thereby improving measurement efficiency.

Optionally, in some embodiments of this application, the fifth measurement result may include but is not limited to the following information: RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the sixth measurement result may include but is not limited to the following information: channel information, and the channel information is used to indicate the network device to determine scheduling data and a serving cell. In this embodiment of this application, information included in the fifth measurement result and the sixth measurement result and corresponding functions are separately described, so that the technical solution of this application is more specific, and integrity of the solution is improved.

Optionally, in some embodiments of this application, the intra-frequency frequency carries a specific identifier, and before the determining a RMTC measurement periodicity and a DMTC measurement periodicity of a secondary cell intra-frequency frequency for LAA, the method may further include: when RRC configures secondary cell intra-frequency DMTC measurement, if the configured intra-frequency frequency is in a third RMTC measurement list, adding the specific identifier to the intra-frequency frequency in the third RMTC measurement list; and when the terminal configures intra-frequency RMTC measurement through the RRC, if the configured intra-frequency frequency is in a third DMTC measurement list, adding, by the terminal, the specific identifier to the intra-frequency frequency in the third DMTC measurement list.

In this embodiment of this application, the specific identifier may be a number, a letter, or the like, and is used to indicate that both the RMTC measurement and the DMTC measurement need to be performed on the intra-frequency frequency. When measuring the intra-frequency frequency, the terminal may first determine whether the intra-frequency frequency carries the specific identifier. If the intra-frequency frequency does not carry the specific identifier, the terminal does not need to perform the joint measurement on the intra-frequency frequency. If the intra-frequency frequency carries the specific identifier, the terminal performs the joint measurement on the intra-frequency frequency. In this embodiment of this application, the intra-frequency frequency is described, and only an intra-frequency frequency to which the specific identifier is added requires the joint measurement.

Optionally, for an intra-frequency frequency that requires the joint measurement, alternatively, a joint measurement table may be separately stored. When measuring an intra-frequency frequency, the terminal may first find whether the joint measurement table stores the intra-frequency frequency. If the joint measurement table does not store the intra-frequency frequency, the terminal does not need to perform the joint measurement on the intra-frequency frequency; or if the joint measurement table stores the intra-frequency frequency, the terminal performs the joint measurement on the intra-frequency frequency.

Optionally, in some embodiments of this application, the intra-frequency frequency carries the specific identifier, and after the sending the fifth measurement result and the sixth measurement result to a network device, the method may further include: when the RRC deconfigures the intra-frequency DMTC measurement, if the deconfigured intra-frequency frequency is in the third RMTC measurement list, clearing the specific identifier from the third RMTC measurement list; and when the RRC deconfigures the intra-frequency RMTC measurement, if the deconfigured intra-frequency frequency is in the third DMTC measurement list, clearing the specific identifier from the third DMTC measurement list. After the RMTC measurement and the DMTC measurement are performed on the intra-frequency frequency, because the intra-frequency frequency has been measured, the specific identifier of the intra-frequency frequency may be cleared from the corresponding RMTC measurement list; and the specific identifier of the intra-frequency frequency may be cleared from the corresponding DMTC measurement list. In this way, it can be ensured that a measured intra-frequency frequency does not need to be measured again, thereby saving system resources.

A fourth aspect of the embodiments of this application provides a measurement apparatus. The measurement apparatus has a function of the method in any one of the first aspect and the possible designs of the first aspect, the method in any one of the second aspect and the possible designs of the second aspect, or the method in any one of the third aspect or the possible designs of the third aspect. The function may be implemented by hardware, or may be implemented by hardware by executing corresponding software. The hardware or the software includes one or more modules corresponding to the foregoing function.

A fifth aspect of the embodiments of this application provides a measurement apparatus, including:

a memory, configured to store a program; and a processor, configured to execute the program stored in the memory, where when the program is executed, the processor is configured to perform any one of the aspects or the possible implementations of the aspects.

Optionally, the memory may be a physically independent unit, or may be integrated with the processor.

In an implementation of the fifth aspect, the measurement apparatus may be a chip.

Another aspect of this application provides a computer-readable storage medium, where the computer-readable storage medium stores an instruction, and when the instruction is run on a computer, the computer is enabled to perform the methods according to the foregoing aspects.

Another aspect of this application provides a computer program product including an instruction, and when the computer program product runs on a computer, the computer is enabled to perform the methods according to the foregoing aspects.

Another aspect of this application provides a computer program, and when the computer program is run on a computer, the computer is enabled to perform the methods according to the foregoing aspects.

BRIEF DESCRIPTION OF DRAWINGS

To describe the technical solutions in the embodiments of this application more clearly, the following briefly describes the accompanying drawings required for describing the prior art or the embodiments. Apparently, the accompanying drawings in the following description show merely some embodiments of this application, and other drawings may still be derived from these accompanying drawings.

DESCRIPTION OF EMBODIMENTS

Figure 1:
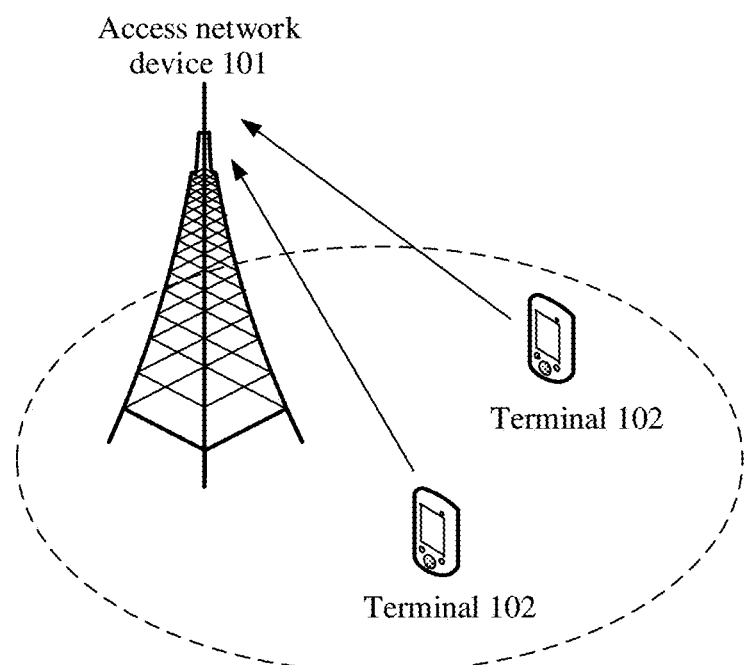
FIG. 1 is an architectural diagram of a system to which an embodiment of this application is applied.

Embodiments of this application provide a joint scheduling method, to perform RMTC measurement and DMTC measurement on the same frequency, reduce a probability of missed measurement or re-measurement, and save system resources.

To make a person skilled in the art understand solutions in this application better, the following describes the technical solutions in the embodiments of this application with reference to the accompanying drawings in the embodiments of this application. It is clear that the described embodiments are merely some rather than all of the embodiments of this application. All the embodiments based on this application shall fall within the protection scope of this application.

RRC of a terminal calculates a duty cycle based on an RSSI decibel milliwatt (dbm) value of each symbol reported by a physical layer, determines whether a current frequency is busy or idle, and then reports the status to the base station. A base station side determines, based on the status reported by the UE, whether an idle Wi-Fi frequency band can be occupied, and activates an LAA secondary cell (SCell), to implement listen before talk (LBT).

LAA reuses a demodulation reference signal (DRS) design of an R12 small cell to perform LAA measurement. A DRS may include a primary synchronization signal (PSS), a secondary synchronization signal (SSS), and a cell-specific reference signal (CRS), and may include a channel state information-reference signal (CSI-RS).

For an unlicensed frequency, an evolved NodeB (eNodeB, eNB) cannot always send a CRS signal as on a licensed frequency, and in this case, an LAA DRS mainly has the following differences:

1. Limited by LBT, some cell base stations may fail to preempt a channel when sending a DRS, and further, during DMTC, a DRS may not be sent in DRS occasions of some cells.

2. Considering a channel occupation time problem, an LAA DRS is sent in only one subframe (a DRS occasion of the R12 small cell may support a plurality of subframes), uses a normal cyclic prefix (CP), and occupies symbols 0 to 11 (in other words, the LAA DRS occupies only at least 12 OFDM symbols). The subframe uses an FDD subframe structure. For subframe timing, refer to a primary cell (PCell). The LAA DRS definitely includes a PSS, an SSS, and a CRS of at least a port 0. A CSI-RS may be configured only in the symbols 0 to 11. It is specified in a related regulation that a CSI-RS used for radio resource management (RRM) of the LAA DRS cannot use resource configurations of 0, 4, 5, 9, 10, 11, 18, and 19.

3. A DRS may be sent together with a data block (Burst). When a DRS is sent together with a physical downlink shared channel (PDSCH)/physical downlink control channel (PDCCH), the DRS can be sent only in the subframes 0 and 5.

4. A base station (eNB) using a frequency may have a plurality of opportunities to send a DRS during the DMTC. That is, when a channel on which a DRS should be sent in a first subframe cannot be preempted, the DRS may be delayed to be sent in a next subframe.

5. When a DRS is separately sent, the DRS may not be sent in the subframes 0 and 5. When the DRS is sent in subframes 0 to 4, a subframe with a number of 0 is used to generate a scrambling sequence of a PSS/an SSS/a CRS/a CSI-RS. When the DRS is sent in subframes 5 to 9, a subframe with a number of 5 is used to generate the scrambling sequence of the PSS/SSS/CRS/CSI-RS.

A possible DMTC periodicity is 40 ms, 80 ms, or 160 ms. For each periodicity, a discovery signal (DS) is sent only at a specific time. A time period for sending the DS is: 1 ms to 5 ms for frequency division duplex (FDD), and 2 ms to 5 ms for time division duplex (TDD).

In the prior art, both a DMTC measurement periodicity and an RMTC measurement periodicity of each LAA frequency are relatively long. In actual applications, the two configurations coexist, and often conflict with each other. As a result, in the DMTC measurement periodicity and the RMTC measurement periodicity, some frequencies with low priorities during a conflict are not scheduled, and lose a measurement opportunity.

When both DMTC and RMTC are configured in an LAA scenario, due to resource conflicts, a frequency configured with a DMTC or RMTC is not scheduled and cannot be measured. This application provides a solution: DMTC measurement and RMTC measurement are performed on a same frequency, to reduce re-scheduling times of the same frequency, shorten a discovery time of an LAA cell, accelerate access, and improve user experience. There are the following three LAA searching and measurement scenarios:

(1) A same gap is used for inter-frequency DMTC measurement and RMTC measurement.

(2) A same idle component carrier (CC) is used for inter-frequency DMTC measurement and RMTC measurement (gap-free measurement).

(3) A same secondary cell channel resource is used for intra-frequency DMTC measurement and RMTC measurement.

A specific embodiment of this application includes the foregoing three basic scenarios and any combination of the foregoing three basic scenarios. FIG. 1 is an architectural diagram of a system to which an embodiment of this application is applied. As shown in FIG. 1, an access network device 101 includes a base station. Specifically, for example, the access network device 101 includes but is not limited to a next-generation NodeB (g NodeB, gNB) in 5G, an eNB, a radio network controller (RNC), a NodeB (NB), a base station controller (BSC), a base transceiver station (BTS), a home base station (for example, a home evolved NodeB, or a Home NodeB, an HNB), a baseband unit (BBU), a transmission reception point (TRP), a transmission point (TP), a mobile switching center, and the like.

A terminal 102 may be UE, an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or the like.

Figure 2:
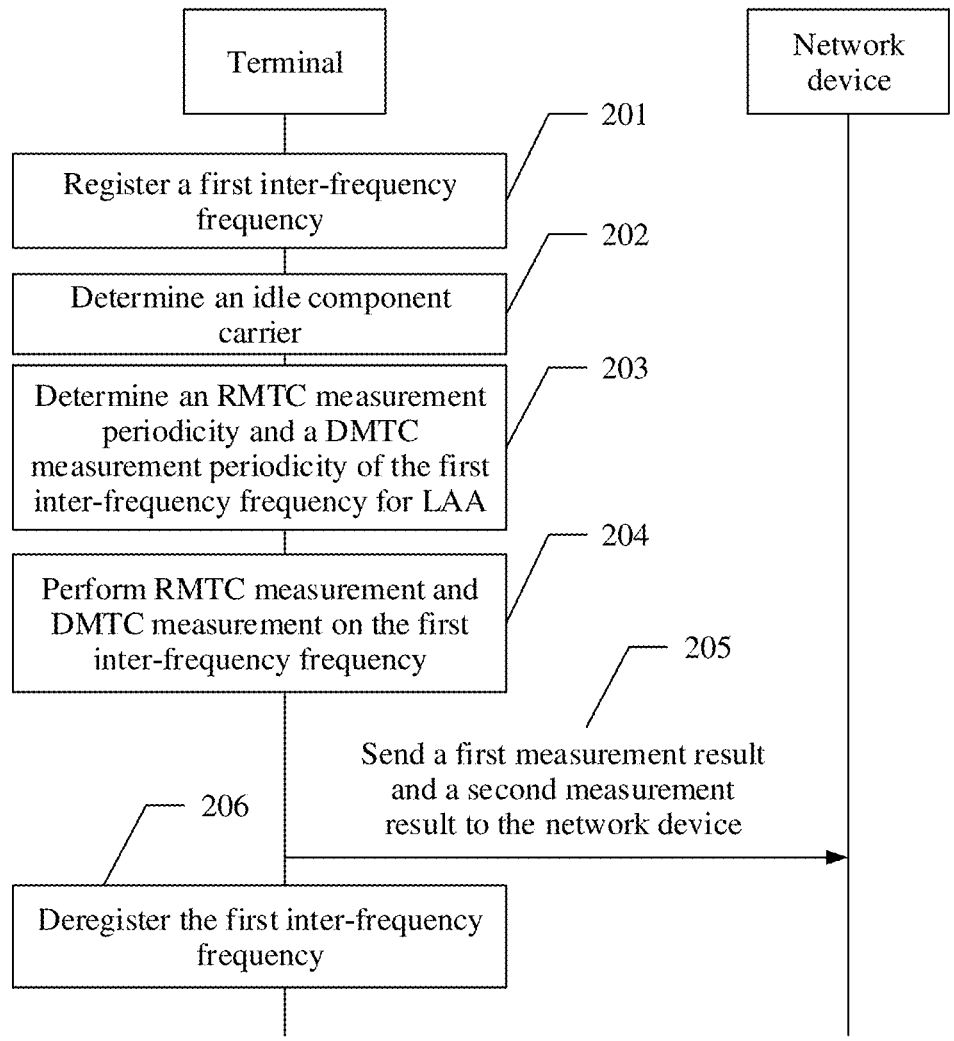
FIG. 2 is a schematic diagram of an embodiment of a measurement method according to an embodiment of this application.

The following further describes the technical solutions of this application by using embodiments. FIG. 2 is a schematic diagram of an embodiment of a measurement method according to an embodiment of this application. That is, FIG. 2 shows a scenario in which a same idle CC is used for inter-frequency DMTC measurement and RMTC measurement, and the following steps may be included.

201. Register a first inter-frequency frequency.

In this embodiment of this application, when a terminal configures inter-frequency DMTC measurement through RRC, if the configured first inter-frequency frequency is in a first RMTC measurement list, the terminal registers the first inter-frequency frequency as a frequency for joint measurement in the first RMTC measurement list, that is, the terminal adds a joint measurement identifier to the first inter-frequency frequency. When the terminal configures inter-frequency RMTC measurement through the RRC, if the configured first inter-frequency frequency is in a first DMTC measurement list, the terminal registers the first inter-frequency frequency as a frequency for joint measurement in the first DMTC measurement list, that is, the terminal adds a joint measurement identifier to the first inter-frequency frequency. It may be understood that a plurality of inter-frequency frequencies may be registered herein.

It should be noted that the joint measurement identifier may be a specific identifier such as a number or a letter, and is used to indicate that both the RMTC measurement and the DMTC measurement need to be performed on the first inter-frequency frequency. When measuring the first inter-frequency frequency, the terminal may first determine whether the first inter-frequency frequency carries the joint measurement identifier. If the first inter-frequency frequency does not carry the joint measurement identifier, the terminal does not need to perform the joint measurement on the first inter-frequency frequency. If the first inter-frequency frequency carries the joint measurement identifier, the terminal performs the joint measurement on the first inter-frequency frequency.

Optionally, for an inter-frequency frequency that requires the joint measurement, alternatively, a joint measurement table may be separately stored. When measuring the first inter-frequency frequency, the terminal may first find whether the joint measurement table stores the inter-frequency frequency. If the joint measurement table does not store the inter-frequency frequency, the terminal does not need to perform the joint measurement on the first inter-frequency frequency; or if the joint measurement table stores the inter-frequency frequency, the terminal performs the joint measurement on the first inter-frequency frequency.

202: Determine an idle component carrier.

The terminal determines whether there is an idle component carrier. If there is an idle CC receive channel resource, the terminal starts an inter-frequency SCell measurement mode (namely, gap-free measurement).

If the terminal has N idle CC receive channel resources, the terminal may select, from a first inter-frequency RMTC measurement list, N inter-frequency frequencies for joint measurement to perform gap-free measurement. For a remaining inter-frequency frequency, the terminal can perform measurement in another manner. N is an integer greater than 0.

203. Determine an RMTC measurement periodicity and a DMTC measurement periodicity of the first inter-frequency frequency for LAA.

The terminal determines the RMTC measurement periodicity and the DMTC measurement periodicity of the first inter-frequency frequency for the LAA. It should be noted that an RMTC measurement periodicity and a DMTC measurement periodicity of each inter-frequency frequency are preconfigured. Herein, when determining to measure the first inter-frequency frequency, the terminal may first determine whether the first inter-frequency frequency is a frequency for joint measurement. If the first inter-frequency frequency is a frequency for joint measurement, the terminal may determine the RMTC measurement periodicity and the DMTC measurement periodicity of the first inter-frequency frequency through searching.

The terminal may sequentially select the first inter-frequency frequency, may randomly select the first inter-frequency frequency, or may select the first inter-frequency frequency by using another selection method. This is not specifically limited herein.

204. Perform RMTC measurement and DMTC measurement on the first inter-frequency frequency.

When the RMTC measurement periodicity and the DMTC measurement periodicity of the first inter-frequency frequency share the same time point, the terminal separately performs the RMTC measurement on the first inter-frequency frequency by using the idle component carrier to obtain a first measurement result, and performs the DMTC measurement on the first inter-frequency frequency to obtain a second measurement result.

It should be noted that the RMTC measurement periodicity and the DMTC measurement periodicity of the first inter-frequency frequency each include a corresponding start time point, corresponding duration, and a corresponding end time point. When the RMTC measurement periodicity and the DMTC measurement periodicity of the first inter-frequency frequency have an intersection, the idle component carrier may be used to perform the RMTC measurement on the first inter-frequency frequency to obtain the first measurement result, and perform the DMTC measurement on the first inter-frequency frequency to obtain the second measurement result.

The first measurement result may include: RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied.

For example, the first measurement result may include: an RSSI average value RSSI-Result-r13 of all OFDM symbols in one measurement reporting periodicity (reportInterval), and a percentage by which an RSSI of an OFDM symbol is greater than a threshold channelOccupancy-r13. Main function: Whether the measured first inter-frequency frequency is occupied may be indicated to the network device. If the first inter-frequency frequency is not occupied or is not fully occupied, the network device may use the first inter-frequency frequency to perform data transmission. In other words, the network device indicates the terminal to start to receive data on the first inter-frequency frequency.

The second measurement result includes channel information, and the channel information is used to indicate the network device to determine scheduling data and a serving cell. The channel information herein may include information such as channel quality and remaining bandwidth.

For example, the second measurement result mainly has two functions, which are shown as follows:

(1) The terminal determines, through the DMTC measurement, whether data at the time is to be sent to the terminal, and if the data is to be sent to the terminal, the terminal receives the data and performs data transmission.

(2) The terminal reports a measurement result of the first inter-frequency frequency to the network device through the DMTC measurement, and the network device determines quality of a measured channel, and determines a size of data to be subsequently scheduled and whether the cell can be further used. If the cell cannot be used, the terminal is handed over to a new frequency or cell.

It may be understood that the network device may be an access network device or the like, or may be a core network device. This is not specifically limited herein.

For example, the terminal calculates a measurement start time point corresponding to a latest RMTC measurement periodicity of the first inter-frequency frequency and a measurement start time point corresponding to a latest DMTC measurement periodicity. If the two types of measurement overlap, in other words, the measurement start time point of the DMTC/RMTC measurement falls within the RMTC measurement duration/the DMTC measurement periodicity, the terminal performs the joint measurement at an earlier measurement start time, that is, the terminal can perform the RMTC measurement and the DMTC measurement on the first inter-frequency frequency at the same time.

205. Send the first measurement result and the second measurement result to the network device.

The terminal sends the first measurement result and the second measurement result to the network device, where the first measurement result and the second measurement result are used to indicate the network device to schedule a resource. For details about information included in each of the first measurement result and the second measurement result and functions of the first measurement result and the second measurement result, refer to the description of step 204. Details are not described herein again.

206. Deregister the first inter-frequency frequency.

In this embodiment of this application, when the terminal deconfigures the inter-frequency DMTC measurement through the RRC, if a deconfigured first inter-frequency frequency is in the first RMTC measurement list, the terminal deregisters the first inter-frequency frequency from the first RMTC measurement list, in other words, the terminal sets the first inter-frequency frequency to be invalid, and clears the joint measurement identifier; and when the terminal deconfigures the inter-frequency RMTC measurement through the RRC, if the deconfigured first inter-frequency frequency is in the first DMTC measurement list, the terminal deregisters the first inter-frequency frequency from the first DMTC measurement list, in other words, the terminal sets the first inter-frequency frequency to be invalid, and clears the joint measurement identifier.

In this embodiment of this application, the DMTC measurement and the RMTC measurement are performed on a same inter-frequency frequency, so that a probability of missed measurement or re-measurement is reduced, system resources are saved, LAA measurement duration can be shortened, LAA cell discovery time can be shortened, access can be accelerated, user experience can be improved, and power consumption can also be optimized.

Figure 3:
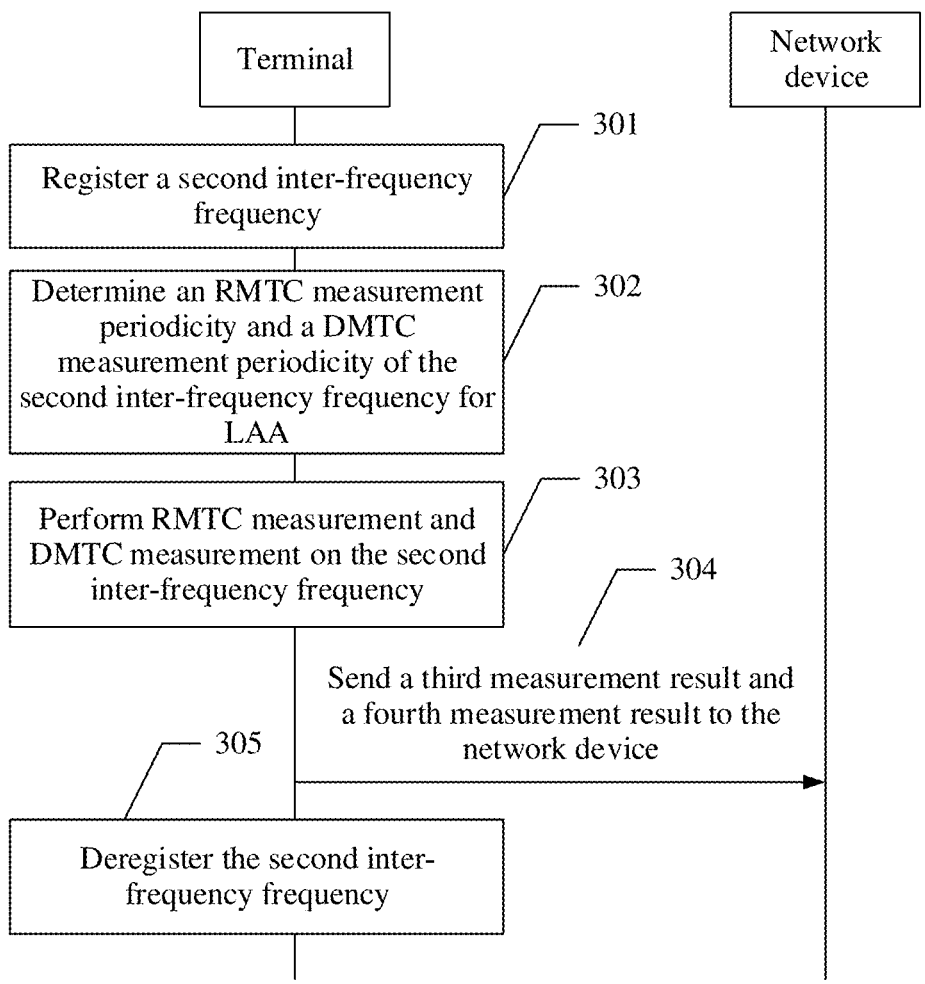
FIG. 3 is a schematic diagram of another embodiment of a measurement method according to an embodiment of this application.

FIG. 3 is a schematic diagram of an embodiment of a measurement method according to an embodiment of this application. That is, FIG. 3 shows a scenario in which a same gap is used to perform inter-frequency DMTC measurement and RMTC measurement, and the following steps may be included.

301. Register a second inter-frequency frequency.

In this embodiment of this application, when a terminal configures inter-frequency DMTC measurement through RRC, if the configured second inter-frequency frequency is in a second RMTC measurement list, the terminal registers the second inter-frequency frequency as a frequency for joint measurement in the second RMTC measurement list, that is, the terminal adds a joint measurement identifier to the second inter-frequency frequency. When the terminal configures inter-frequency RMTC measurement through the RRC, if the configured second inter-frequency frequency is in a second DMTC measurement list, the terminal registers the second inter-frequency frequency as a frequency for joint measurement in the second DMTC measurement list, that is, the terminal adds a joint measurement identifier to the second inter-frequency frequency. It may be understood that a plurality of inter-frequency frequencies may be registered herein.

It should be noted that the joint measurement identifier may be a specific identifier such as a number or a letter, and is used to indicate that both the RMTC measurement and the DMTC measurement need to be performed on the second inter-frequency frequency. When measuring the second inter-frequency frequency, the terminal may first determine whether the second inter-frequency frequency carries the joint measurement identifier. If the second inter-frequency frequency does not carry the joint measurement identifier, the terminal does not need to perform the joint measurement on the second inter-frequency frequency. If the second inter-frequency frequency carries the joint measurement identifier, the terminal performs the joint measurement on the second inter-frequency frequency.

Optionally, for an inter-frequency frequency that requires the joint measurement, alternatively, a joint measurement table may be separately stored. When measuring the second inter-frequency frequency, the terminal may first find whether the joint measurement table stores the inter-frequency frequency. If the joint measurement table does not store the inter-frequency frequency, the terminal does not need to perform the joint measurement on the second inter-frequency frequency; or if the joint measurement table stores the inter-frequency frequency, the terminal performs the joint measurement on the second inter-frequency frequency.

302. Determine an RMTC measurement periodicity and a DMTC measurement periodicity of the second inter-frequency frequency for LAA.

The terminal determines the RMTC measurement periodicity and the DMTC measurement periodicity of the second inter-frequency frequency for the LAA. It should be noted that an RMTC measurement periodicity and a DMTC measurement periodicity of each inter-frequency frequency are preconfigured. Herein, when determining to measure the second inter-frequency frequency, the terminal may first determine whether the second inter-frequency frequency is a frequency for joint measurement. If the second inter-frequency frequency is a frequency for joint measurement, the terminal may search for the RMTC measurement periodicity and the DMTC measurement periodicity of the second inter-frequency frequency.

The terminal may sequentially select the second inter-frequency frequency, may randomly select the second inter-frequency frequency, or may select the second inter-frequency frequency by using another selection method. This is not specifically limited herein.

303. Perform RMTC measurement and DMTC measurement on the second inter-frequency frequency.

In this embodiment of this application, in each gap, the terminal performs the RMTC measurement on the second inter-frequency frequency to obtain a third measurement result, when a start time of the RMTC measurement periodicity of the second inter-frequency frequency for the LAA falls within the gap; and performs the DMTC measurement on the second inter-frequency frequency to obtain a fourth measurement result, when a start time of the DMTC measurement periodicity of the second inter-frequency frequency for the LAA falls within the gap. A gap is configured by the network device for the terminal, and one gap can indicate the terminal to measure only one inter-frequency frequency.

For example, when each gap arrives, the terminal first checks whether a measurement start time point of a measurement periodicity of a second inter-frequency frequency in an inter-frequency RMTC measurement list falls within the gap. If the measurement start time point falls within the gap, the terminal determines that the gap is used for RMTC measurement on the second inter-frequency frequency, that is, the terminal performs the RMTC measurement on the second inter-frequency frequency. If the second inter-frequency frequency is a frequency for joint measurement, the terminal further needs to check whether a measurement start time point corresponding to a DMTC measurement periodicity also falls within the gap. If the measurement start time point falls within the gap, the terminal determines that the gap is used for DMTC measurement on the second inter-frequency frequency, that is, the terminal performs the DMTC measurement on the second inter-frequency frequency.

It should be noted that the measurement start time points of the DMTC measurement periodicity and the RMTC measurement periodicity of the second inter-frequency frequency need to fall within a measurement reporting periodicity. The measurement reporting periodicity is clearly defined in a protocol, and is referred to as a measurement reporting periodicity of the UE. Within the measurement reporting periodicity of the UE, a physical layer reports a measurement value of each frequency for (at least) one time. Based on different measurement types, measurement reporting periods can be classified into intra-frequency, inter-frequency/inter-RAT, and SCell measurement reporting periods. Calculation of a specific measurement reporting periodicity of the UE is affected by factors such as a quantity of frequencies to be measured, a drx configuration and periodicity, and a drx status.

The third measurement result may include: RSSI information of an orthogonal frequency division multiplexing symbol in the RMTC measurement periodicity of the second inter-frequency frequency, where the RSSI information of the orthogonal frequency division multiplexing symbol is used to indicate, to the network device, whether the second inter-frequency frequency is occupied.

For example, the third measurement result may include: an RSSI average value RSSI-Result-r13 of all OFDM symbols in one measurement reporting periodicity (reportInterval), and a percentage by which an RSSI of an OFDM symbol is greater than a threshold channelOccupancy-r13. Main function: Whether the measured second inter-frequency frequency is occupied may be indicated to the network device. If the second inter-frequency frequency is not occupied or is not fully occupied, the network device may use the second inter-frequency frequency to perform data transmission. In other words, the network device indicates the terminal to start to receive data at the second inter-frequency frequency.

The fourth measurement result includes channel information, and the channel information is used to indicate the network device to determine scheduling data and a serving cell. The channel information herein may include information such as channel quality and remaining bandwidth.

For example, the fourth measurement result mainly has two functions, which are shown as follows:

(1) The terminal determines, through the DMTC measurement, whether data at the time is to be sent to the terminal, and if the data is to be sent to the terminal, the terminal receives the data and performs data transmission.

(2) The terminal reports a measurement result of the second inter-frequency frequency to the network device through the DMTC measurement, and the network device determines quality of a measured channel, and determines a size of data to be subsequently scheduled and whether the cell can be further used. If the cell cannot be used, the terminal is handed over to a new frequency or cell.

It may be understood that the network device may be an access network device or the like, or may be a core network device. This is not specifically limited herein.

304. Send the third measurement result and the fourth measurement result to the network device.

The terminal sends the third measurement result and the fourth measurement result to the network device, where the third measurement result and the fourth measurement result are used to indicate the network device to schedule a resource. For details about information included in each of the third measurement result and the fourth measurement result and functions of the third measurement result and the fourth measurement result, refer to the description of step 303. Details are not described herein again.

305. Deregister the second inter-frequency frequency.

In this embodiment of this application, when the terminal deconfigures the inter-frequency DMTC measurement through the RRC, if a deconfigured second inter-frequency frequency is in the second RMTC measurement list, the terminal deregisters the second inter-frequency frequency from the second RMTC measurement list, in other words, the terminal sets the second inter-frequency frequency to be invalid, and clears the joint measurement identifier; and when the terminal deconfigures the inter-frequency RMTC measurement through the RRC, if the deconfigured second inter-frequency frequency is in the second DMTC measurement list, the terminal deregisters the second inter-frequency frequency from the second DMTC measurement list, in other words, the terminal sets the second inter-frequency frequency to be invalid, and clears the joint measurement identifier.

In this embodiment of this application, the DMTC measurement and the RMTC measurement are performed on a same inter-frequency frequency, so that a probability of missed measurement or re-measurement is reduced, system resources are saved, LAA measurement duration can be shortened, LAA cell discovery time can be shortened, access can be accelerated, user experience can be improved, and power consumption can also be optimized.

Figure 4:
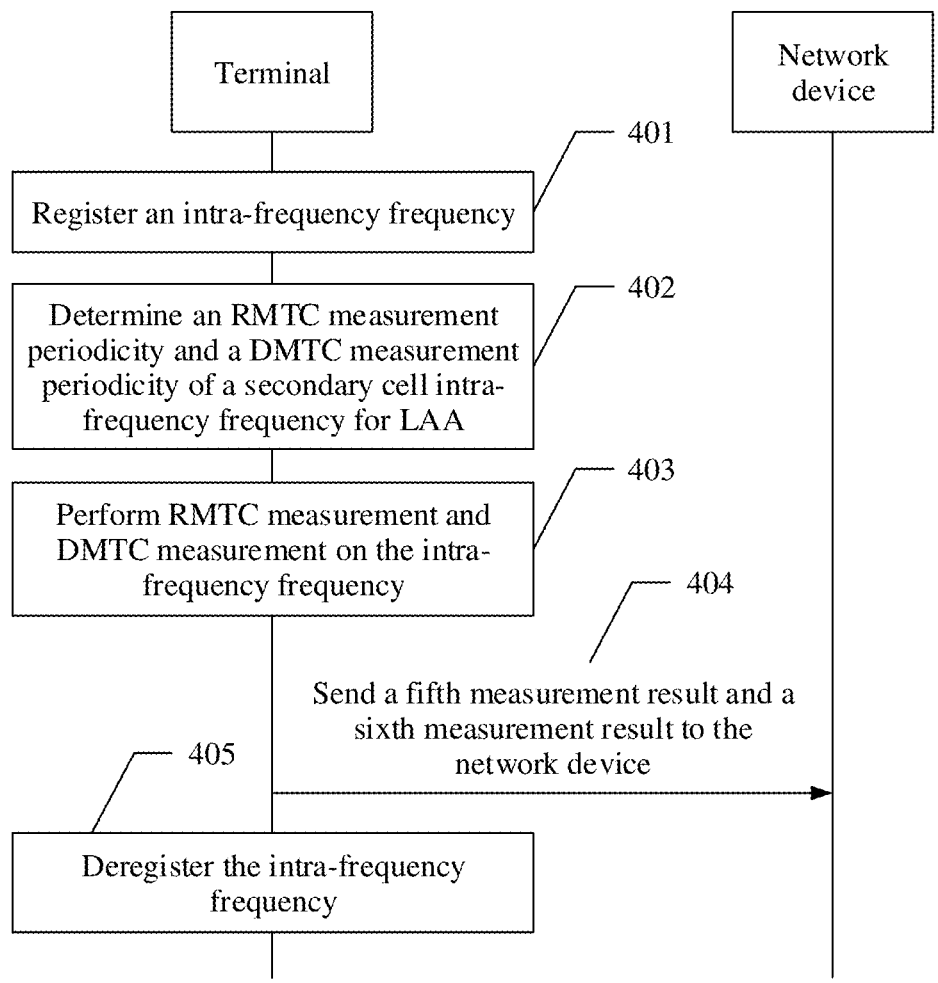
FIG. 4 is a schematic diagram of another embodiment of a measurement method according to an embodiment of this application.

FIG. 4 is a schematic diagram of an embodiment of a measurement method according to an embodiment of this application. That is, FIG. 4 shows a scenario in which a same SCell channel is used to simultaneously perform intra-frequency DMTC measurement and RMTC measurement, and the following steps may be included.

401. Register an intra-frequency frequency.

In this embodiment of this application, when a terminal configures SCell DMTC measurement through RRC, if the configured intra-frequency frequency is in a SCell RMTC measurement list, the terminal registers the intra-frequency frequency as a frequency for joint measurement in the SCell RMTC measurement list, that is, the terminal adds a joint measurement identifier to the intra-frequency frequency. When the terminal configures SCell RMTC measurement through the RRC, if the configured intra-frequency frequency is in a SCell DMTC measurement list, the terminal registers the intra-frequency frequency as a frequency for joint measurement in the SCell DMTC measurement list, that is, the terminal adds a joint measurement identifier to the intra-frequency frequency. It may be understood that a plurality of intra-frequency frequencies may be registered herein.

It should be noted that the joint measurement identifier may be a specific identifier such as a number or a letter, and is used to indicate that both the RMTC measurement and the DMTC measurement need to be performed on the intra-frequency frequency. When measuring the intra-frequency frequency, the terminal may first determine whether the intra-frequency frequency carries the joint measurement identifier. If the intra-frequency frequency does not carry the joint measurement identifier, the terminal does not need to perform the joint measurement on the intra-frequency frequency. If the intra-frequency frequency carries the joint measurement identifier, the terminal performs the joint measurement on the intra-frequency frequency.

Optionally, for an intra-frequency frequency that requires the joint measurement, alternatively, a joint measurement table may be separately stored. When measuring the intra-frequency frequency, the terminal may first find whether the joint measurement table stores the intra-frequency frequency. If the joint measurement table does not store the intra-frequency frequency, the terminal does not need to perform the joint measurement on the intra-frequency frequency; or if the joint measurement table stores the intra-frequency frequency, the terminal performs the joint measurement on the intra-frequency frequency. It may be understood that a plurality of intra-frequency frequencies may be registered herein.

402. Determine an RMTC measurement periodicity and a DMTC measurement periodicity of a secondary cell intra-frequency frequency for LAA.

The terminal determines the RMTC measurement periodicity and the DMTC measurement periodicity of the secondary cell intra-frequency frequency for the LAA. It should be noted that an RMTC measurement periodicity and a DMTC measurement periodicity of each intra-frequency frequency are preconfigured. Herein, when determining to measure the intra-frequency frequency, the terminal may first determine whether the intra-frequency frequency is a frequency for joint measurement. If the intra-frequency frequency is a frequency for joint measurement, the terminal may search for the RMTC measurement periodicity and the DMTC measurement periodicity of the intra-frequency frequency.

The terminal may sequentially select the intra-frequency frequency, may randomly select the first inter-frequency frequency, or may select the first inter-frequency frequency by using another selection method. This is not specifically limited herein.

403. Perform RMTC measurement and DMTC measurement on the intra-frequency frequency.

The terminal may first determine a secondary cell channel resource, and when the RMTC measurement periodicity and the DMTC measurement periodicity of the secondary cell intra-frequency frequency share the same time point, the terminal uses the secondary cell channel resource to perform the RMTC measurement on the secondary cell intra-frequency frequency, to obtain a fifth measurement result, and uses the secondary cell channel resource to perform the DMTC measurement on the secondary cell intra-frequency frequency, to obtain a sixth measurement result.

For example, for an LAA SCell frequency for joint measurement, the terminal calculates a measurement start time point corresponding to a latest RMTC measurement periodicity of the intra-frequency frequency and a measurement start time point corresponding to a latest DMTC measurement periodicity. If the two types of measurement overlap, in other words, the measurement start time point of the DMTC/RMTC measurement falls within the RMTC measurement periodicity/the DMTC measurement periodicity, the terminal performs the joint measurement at an earlier measurement start time, that is, the terminal performs the DMTC measurement and the RMTC measurement on the intra-frequency frequency.

It should be noted that, if there are M SCell channels, the terminal may select, from a SCell RMTC measurement list, M intra-frequency frequencies for joint measurement, and perform DMTC measurement and RMTC measurement, where M is an integer greater than 0.

404. Send the fifth measurement result and the sixth measurement result to the network device.

The terminal sends the fifth measurement result and the sixth measurement result to the network device, where the fifth measurement result and the sixth measurement result are used to indicate the network device to schedule a resource. For details about information included in each of the fifth measurement result and the sixth measurement result and functions of the fifth measurement result and the sixth measurement result, refer to the description of step 403. Details are not described herein again.

405. Deregister the intra-frequency frequency.

In this embodiment of this application, when the terminal deconfigures the SCell DMTC measurement through the RRC, if a deconfigured intra-frequency frequency is in a SCell RMTC measurement list, the terminal deregisters the intra-frequency frequency from the SCell RMTC measurement list, in other words, the terminal sets the intra-frequency frequency to be invalid, and clears the joint measurement identifier; and when the RRC deconfigures the SCell RMTC measurement, if the deconfigured intra-frequency frequency is in the SCell DMTC measurement list, the terminal deregisters the intra-frequency frequency from the SCell DMTC measurement list, in other words, the terminal sets the intra-frequency frequency to be invalid, and clears the joint measurement identifier.

In this embodiment of this application, the DMTC measurement and the RMTC measurement are performed on a same intra-frequency frequency, so that a probability of missed measurement or re-measurement is reduced, system resources are saved, LAA measurement duration can be shortened, LAA cell discovery time can be shortened, access can be accelerated, user experience can be improved, and power consumption can also be optimized.

It should be noted that, in the foregoing embodiments, the first inter-frequency frequency and the second inter-frequency frequency may be a same inter-frequency frequency, or may be different inter-frequency frequencies. When the first inter-frequency frequency and the second inter-frequency frequency are measured at the same time, the first inter-frequency frequency is different from the second inter-frequency frequency. The first RMTC measurement list and the second RMTC measurement list may be the same or different. The first DMTC measurement list and the second DMTC measurement list may be the same or different. This is not specifically limited.

Embodiment 4 of this application may be a combination of Embodiment 1 and Embodiment 2 of this application. That is, the terminal can measure two or more inter-frequency frequencies at the same time.

In this embodiment of this application, for example, if the terminal determines that there is an idle CC resource within a gap, the terminal may select two inter-frequency frequencies to perform joint measurement separately. That is, the terminal uses a gap to perform DMTC measurement and RMTC measurement on one inter-frequency frequency, and uses an idle CC resource to perform DMTC measurement and RMTC measurement on the other inter-frequency frequency. It may be understood that, if the terminal determines that there are X CC resources, the terminal may correspondingly perform DMTC measurement and RMTC measurement on X inter-frequency frequencies, where X is an integer greater than 0.

It should be noted that, for a specific implementation in which the terminal uses a gap to perform joint measurement on an inter-frequency frequency, refer to the embodiment shown in FIG. 3; and for a specific implementation in which the terminal uses an idle CC resource to perform joint measurement on an inter-frequency frequency, refer to the embodiment shown in FIG. 2. Details are not described herein again.

In this embodiment of this application, when performing joint measurement on an inter-frequency frequency, the terminal may use a gap to perform joint measurement on the inter-frequency frequency, or may use an idle CC resource to perform joint measurement on the inter-frequency frequency, to fully use terminal resources. The DMTC measurement and the RMTC measurement are performed on a same inter-frequency frequency, so that LAA measurement duration can be shortened, LAA cell discovery time can be shortened, access can be accelerated, user experience can be improved, and power consumption can also be optimized.

Embodiment 5 of this application may be a combination of Embodiment 1, Embodiment 2, and Embodiment 3 of this application. That is, the terminal can measure two or more inter-frequency frequencies and at least one SCell.

In this embodiment of this application, for example, in a gap, if the terminal determines that there is an idle CC resource, and the terminal determines a configured SCell channel resource, the terminal may use the gap to perform joint measurement on an inter-frequency frequency, use the idle CC resource to perform joint measurement on another inter-frequency frequency, and use the SCell channel resource to perform joint measurement on an intra-frequency frequency.

It may be understood that, if the terminal determines that there are X CC resources, the terminal may correspondingly perform DMTC measurement and RMTC measurement on X inter-frequency frequencies, where X is an integer greater than 0. If the terminal determines that there are Y SCell channel resources, the terminal may correspondingly perform DMTC measurement and RMTC measurement on Y intra-frequency frequencies, where Y is an integer greater than 0.

It should be noted that, for a specific implementation in which the terminal uses a gap to perform joint measurement on an inter-frequency frequency, refer to the embodiment shown in FIG. 3; for a specific implementation in which the terminal uses an idle CC resource to perform joint measurement on an inter-frequency frequency, refer to the embodiment shown in FIG. 2; and for a specific implementation in which the terminal uses a SCell channel resource to perform joint measurement on an intra-frequency frequency, refer to the embodiment shown in FIG. 4. Details are not described herein again.

In this embodiment of this application, when performing joint measurement on an inter-frequency frequency, the terminal may use a gap to perform joint measurement on the inter-frequency frequency, or may use an idle CC resource to perform joint measurement on the inter-frequency frequency, or may use a SCell channel resource to perform joint measurement on an intra-frequency frequency, to fully use terminal resources. The DMTC measurement and the RMTC measurement are performed on a same inter-frequency frequency, so that LAA measurement duration can be shortened, LAA cell discovery time can be shortened, access can be accelerated, user experience can be improved, and power consumption can also be optimized.

Embodiment 6 of this application may be a combination of Embodiment 1 and Embodiment 3 of this application. That is, the terminal can measure at least one inter-frequency frequency and at least one SCell at the same time.

In this embodiment of this application, for example, if the terminal determines that there is an idle CC resource, and the terminal determines a configured SCell channel resource, the terminal may use the idle CC resource to perform joint measurement on the inter-frequency frequency, and use the SCell channel resource to perform joint measurement on the intra-frequency frequency.

It should be noted that, for a specific implementation in which the terminal uses an idle CC resource to perform joint measurement on an inter-frequency frequency, refer to the embodiment shown in FIG. 2; and for a specific implementation in which the terminal uses a SCell channel resource to perform joint measurement on an intra-frequency frequency, refer to the embodiment shown in FIG. 4. Details are not described herein again.

In this embodiment of this application, when performing joint measurement on an inter-frequency frequency, the terminal may use an idle CC resource to perform joint measurement on the inter-frequency frequency, or may use a SCell channel resource to perform joint measurement on an intra-frequency frequency, to fully use terminal resources. The DMTC measurement and the RMTC measurement are performed on a same inter-frequency frequency, so that LAA measurement duration can be shortened, LAA cell discovery time can be shortened, access can be accelerated, user experience can be improved, and power consumption can also be optimized.

Figure 5A:
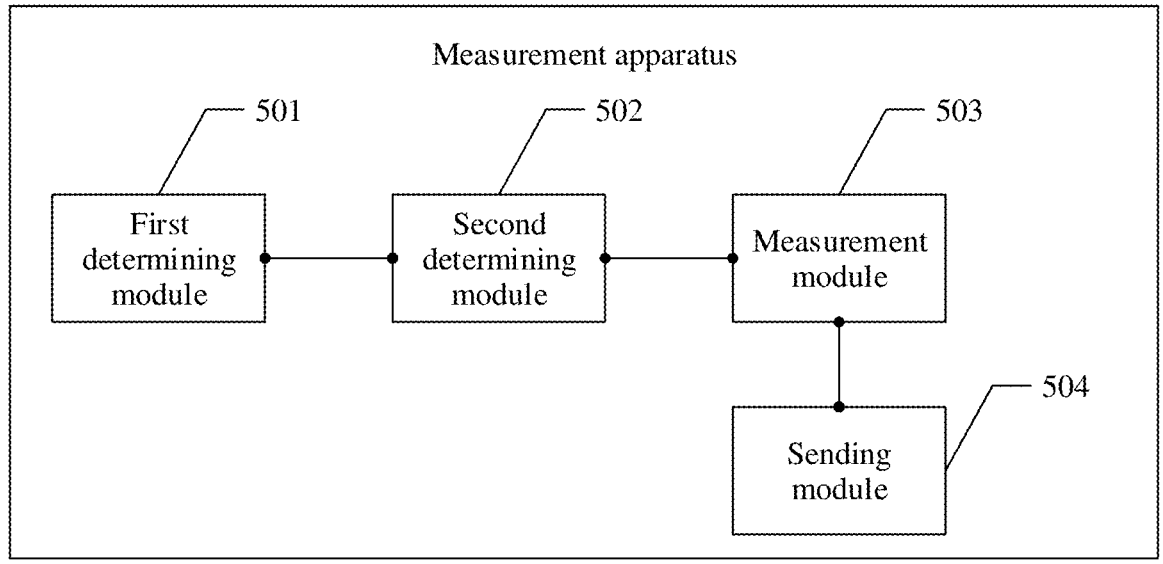
FIG. 5A is a schematic diagram of an embodiment of a measurement apparatus according to an embodiment of this application.

The foregoing describes the method embodiments in this application, and the following describes a measurement apparatus in the embodiments of this application. FIG. 5A is a schematic diagram of an embodiment of the measurement apparatus according to an embodiment of this application. The measurement apparatus includes:

a first determining module 501, configured to determine an idle component carrier;

a second determining module 502, configured to determine a RMTC measurement periodicity and a DMTC measurement periodicity of a first inter-frequency frequency for LAA;

a measurement module 503, configured to: when the RMTC measurement periodicity and the DMTC measurement periodicity of the first inter-frequency frequency share the same time point, separately perform RMTC measurement on the first inter-frequency frequency by using the idle component carrier to obtain a first measurement result, and perform DMTC measurement on the first inter-frequency frequency to obtain a second measurement result; and a sending module 504, configured to send the first measurement result and the second measurement result to a network device, where the first measurement result and the second measurement result are used to indicate the network device to schedule a resource.

Optionally, in some embodiments of this application, the first measurement result includes RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the second measurement result includes channel information, and the channel information is used to indicate the network device to determine scheduling data and a serving cell.

Figure 5B:
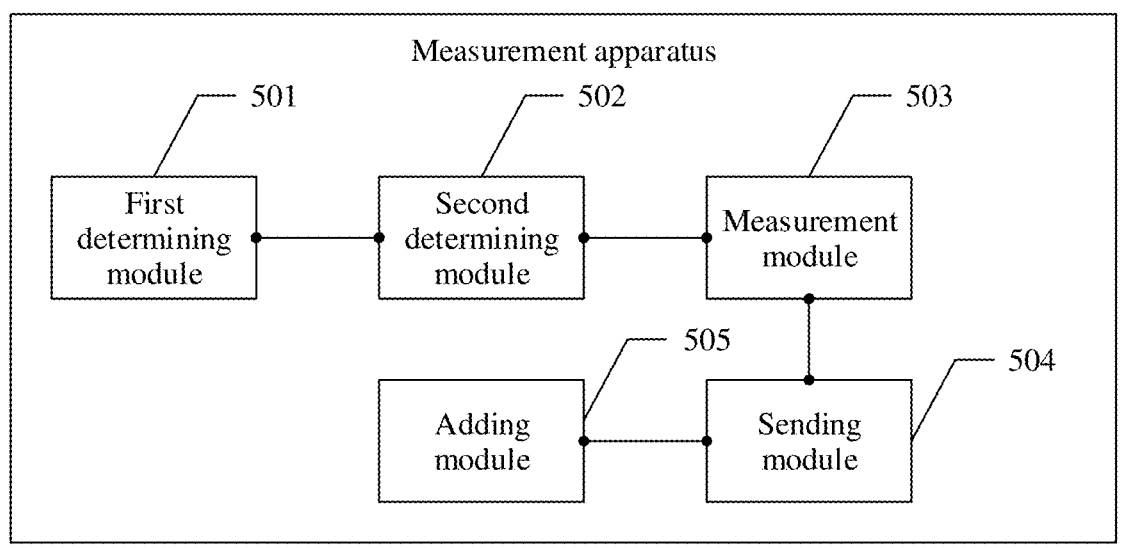
FIG. 5B is a schematic diagram of another embodiment of a measurement apparatus according to an embodiment of this application.

Optionally, in some embodiments of this application, the first inter-frequency frequency carries a specific identifier. FIG. 5B is a schematic diagram of another embodiment of the measurement apparatus according to an embodiment of this application. The measurement apparatus further includes:

an adding module 505, configured to: when RRC configures inter-frequency DMTC measurement, if the configured first inter-frequency frequency is in a first RMTC measurement list, add the specific identifier to the first inter-frequency frequency in the first RMTC measurement list; and when the RRC configures inter-frequency RMTC measurement, if the configured first inter-frequency frequency is in a first DMTC measurement list, add the specific identifier to the first inter-frequency frequency in the first DMTC measurement list.

Figure 5C:
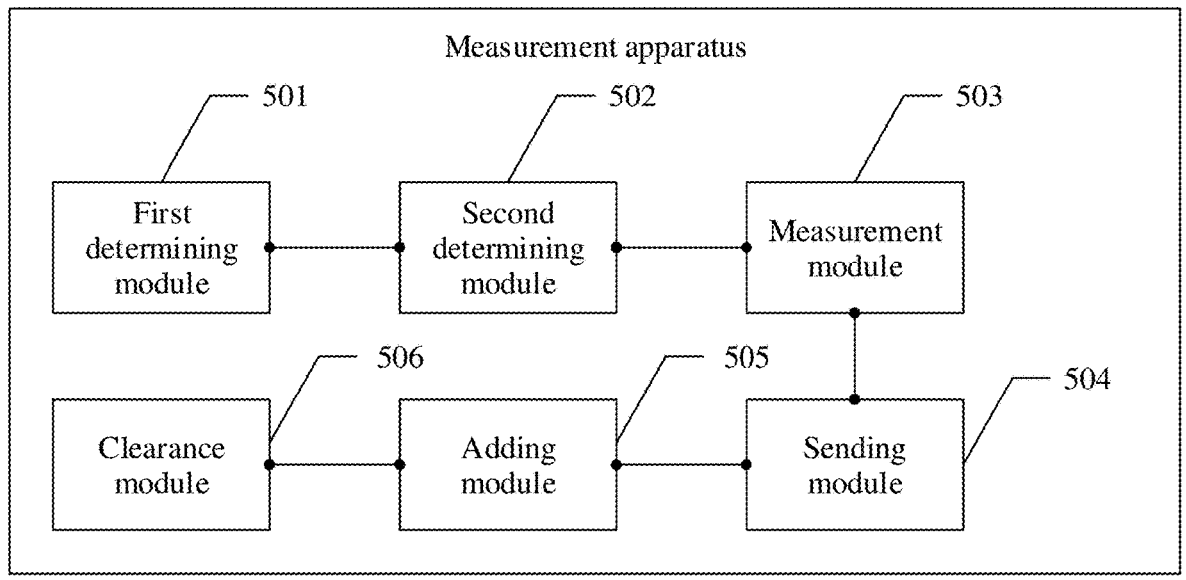
FIG. 5C is a schematic diagram of another embodiment of a measurement apparatus according to an embodiment of this application.

Optionally, in some embodiments of this application, the first inter-frequency frequency carries the specific identifier. FIG. 5C is a schematic diagram of another embodiment of the measurement apparatus according to an embodiment of this application. The measurement apparatus further includes:

a clearance module 506, configured to: when the RRC deconfigures the inter-frequency DMTC measurement, if the deconfigured first inter-frequency frequency is in the first RMTC measurement list, clear the specific identifier from the first RMTC measurement list; and when the RRC deconfigures the inter-frequency RMTC measurement, if the deconfigured first inter-frequency frequency is in the first DMTC measurement list, clear the specific identifier from the first DMTC measurement list.

Figure 6A:
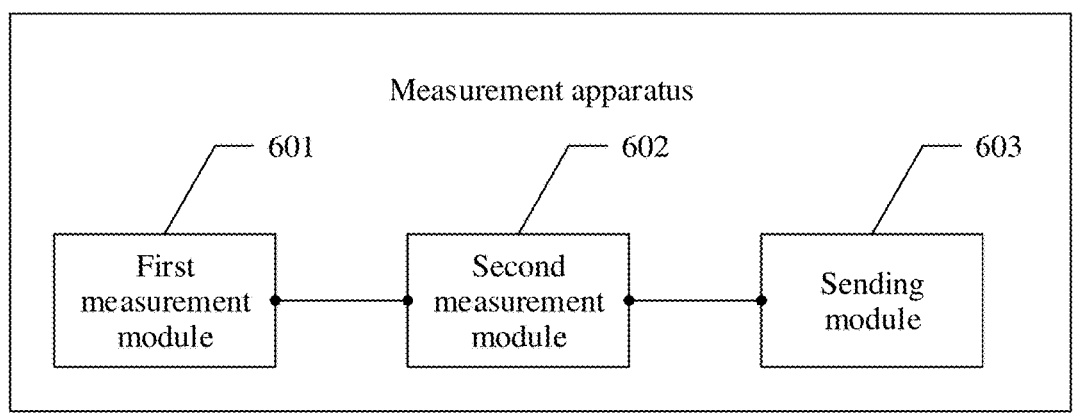
FIG. 6A is a schematic diagram of another embodiment of a measurement apparatus according to an embodiment of this application.

FIG. 6A is a schematic diagram of an embodiment of the measurement apparatus according to an embodiment of this application. The measurement apparatus includes:

a first measurement module 601, configured to: perform RMTC measurement on a second inter-frequency frequency to obtain a third measurement result, when a start time of a RMTC measurement periodicity of the second inter-frequency frequency for LAA falls within a gap;

a second measurement module 602, configured to perform DMTC measurement on the second inter-frequency frequency to obtain a fourth measurement result, when a start time of a DMTC measurement periodicity of the second inter-frequency frequency for the LAA falls within the gap; and a sending module 603, configured to send the third measurement result and the fourth measurement result to a network device, where the third measurement result and the fourth measurement result are used to indicate the network device to schedule a resource.

Optionally, in some embodiments of this application, the third measurement result includes RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the fourth measurement result includes channel information, and the channel information is used to indicate the network device to determine scheduling data and a serving cell.

Figure 6B:
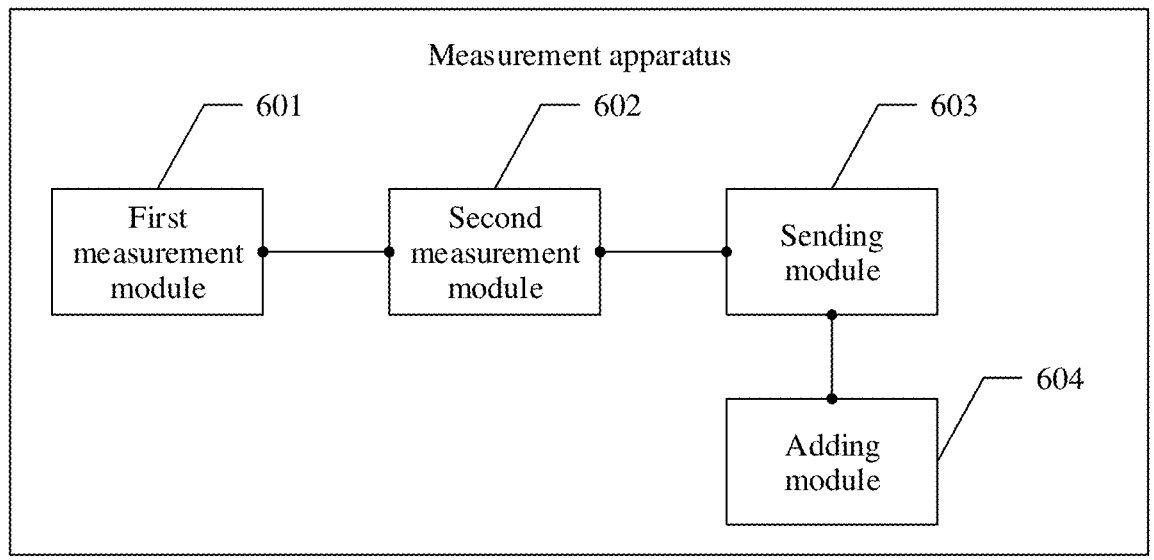
FIG. 6B is a schematic diagram of another embodiment of a measurement apparatus according to an embodiment of this application.

Optionally, in some embodiments of this application, the second inter-frequency frequency carries a specific identifier. FIG. 6B is a schematic diagram of another embodiment of the measurement apparatus according to an embodiment of this application. The measurement apparatus further includes:

an adding module 604, configured to: when RRC configures inter-frequency DMTC measurement, if the configured second inter-frequency frequency is in a second RMTC measurement list, add the specific identifier to the second inter-frequency frequency in the second RMTC measurement list; and when the RRC configures inter-frequency RMTC measurement, if the configured second inter-frequency frequency is in a second DMTC measurement list, add the specific identifier to the second inter-frequency frequency in the second DMTC measurement list.

Figure 6C:
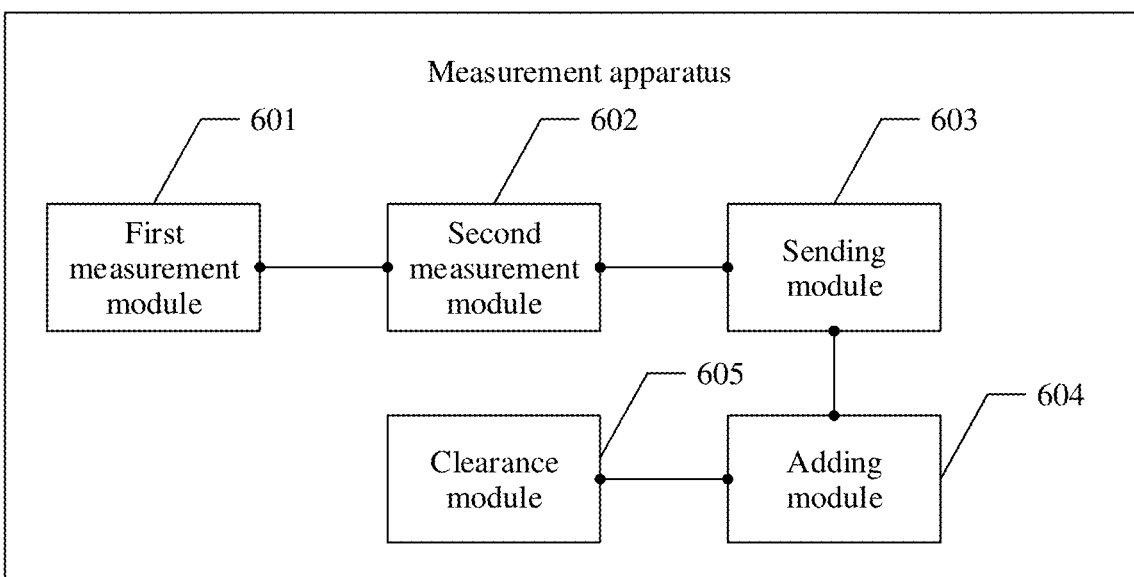
FIG. 6C is a schematic diagram of another embodiment of a measurement apparatus according to an embodiment of this application.

Optionally, in some embodiments of this application, the second inter-frequency frequency carries the specific identifier. FIG. 6C is a schematic diagram of another embodiment of the measurement apparatus according to an embodiment of this application. The measurement apparatus further includes:

a clearance module 605, configured to: when the RRC deconfigures the inter-frequency DMTC measurement, if the deconfigured second inter-frequency frequency is in the second RMTC measurement list, clear the specific identifier from the second RMTC measurement list; and when the RRC deconfigures the inter-frequency RMTC measurement, if the deconfigured second inter-frequency frequency is in the second DMTC measurement list, clear the specific identifier from the second DMTC measurement list.

Figure 7A:
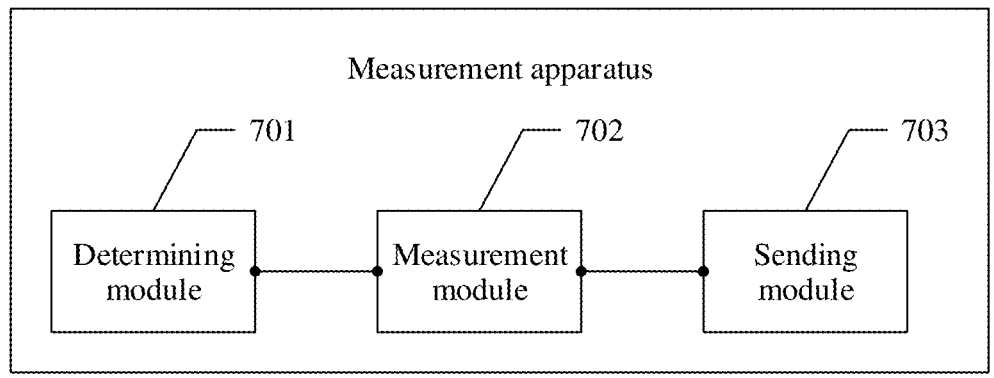
FIG. 7A is a schematic diagram of another embodiment of a measurement apparatus according to an embodiment of this application.

FIG. 7A is a schematic diagram of an embodiment of the measurement apparatus according to an embodiment of this application. The measurement apparatus includes:

a determining module 701, configured to determine a RMTC measurement periodicity and a DMTC measurement periodicity of a secondary cell intra-frequency frequency for LAA;

a measurement module 702, configured to: when the RMTC measurement periodicity and the DMTC measurement periodicity of the secondary cell intra-frequency frequency share the same time point, perform RMTC measurement on the secondary cell intra-frequency frequency to obtain a fifth measurement result, and perform DMTC measurement on the secondary cell intra-frequency frequency, to obtain a sixth measurement result; and a sending module 703, configured to send the fifth measurement result and the sixth measurement result to a network device, where the fifth measurement result and the sixth measurement result are used to indicate the network device to schedule a resource.

Optionally, in some embodiments of this application, the fifth measurement result may include: RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the sixth measurement result may include channel information, and the channel information is used to indicate the network device to determine scheduling data and a serving cell.

Figure 7B:
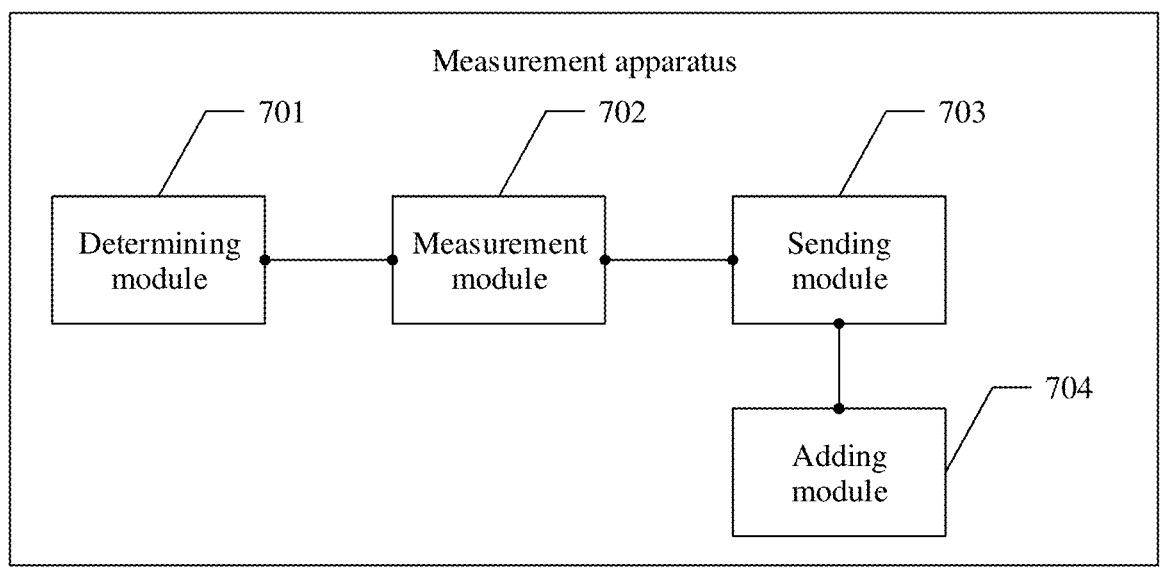
FIG. 7B is a schematic diagram of another embodiment of a measurement apparatus according to an embodiment of this application.

Optionally, in some embodiments of this application, the intra-frequency frequency carries a specific identifier. FIG. 7B is a schematic diagram of another embodiment of the measurement apparatus according to an embodiment of this application. The measurement apparatus further includes:

an adding module 704, configured to: when RRC configures secondary cell intra-frequency DMTC measurement, if the configured intra-frequency frequency is in a third RMTC measurement list, add the specific identifier to the intra-frequency frequency in the third RMTC measurement list; and when the RRC configures intra-frequency RMTC measurement, if the configured intra-frequency frequency is in a third DMTC measurement list, the measurement apparatus adds the specific identifier to the intra-frequency frequency in the third DMTC measurement list.

Figure 7C:
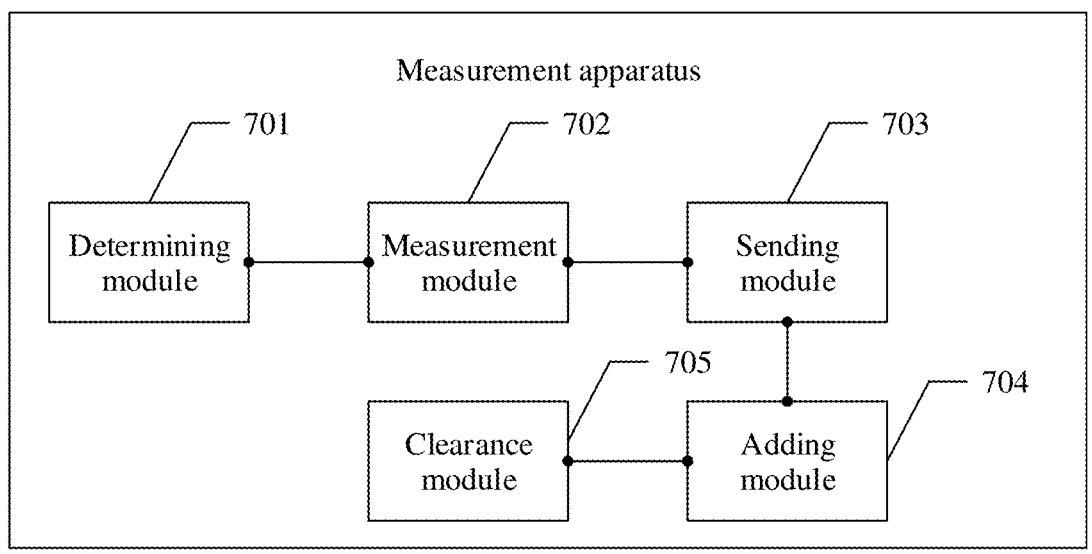
FIG. 7C is a schematic diagram of another embodiment of a measurement apparatus according to an embodiment of this application.

Optionally, in some embodiments of this application, the intra-frequency frequency carries the specific identifier. FIG. 7C is a schematic diagram of another embodiment of the measurement apparatus according to an embodiment of this application. The measurement apparatus further includes:

a clearance module 705, configured to: when the RRC deconfigures the intra-frequency DMTC measurement, if the deconfigured intra-frequency frequency is in the third RMTC measurement list, clear the specific identifier from the third RMTC measurement list; and if the RRC deconfigures the intra-frequency RMTC measurement, if the deconfigured intra-frequency frequency is in the third DMTC measurement list, clear the specific identifier from the third DMTC measurement list.

In this embodiment, the measurement apparatus is presented in a form in which the measurement apparatus is divided into various functional modules corresponding to various functions, or the measurement apparatus is presented in a form in which the measurement apparatus is divided into various functional modules in an integrated manner. The "module" herein may be an application-specific integrated circuit (ASIC), a circuit, an optical component, a processor and a memory for executing one or more software or firmware programs, an integrated logic circuit, and/or another device that can provide the foregoing functions, or a combination thereof.

The measurement apparatus provided in the embodiments of this application may be used to perform the foregoing measurement method. Therefore, for the technical effects that can be achieved by the measurement apparatus, refer to the foregoing method embodiments, and details are not described herein again.

Figure 8:
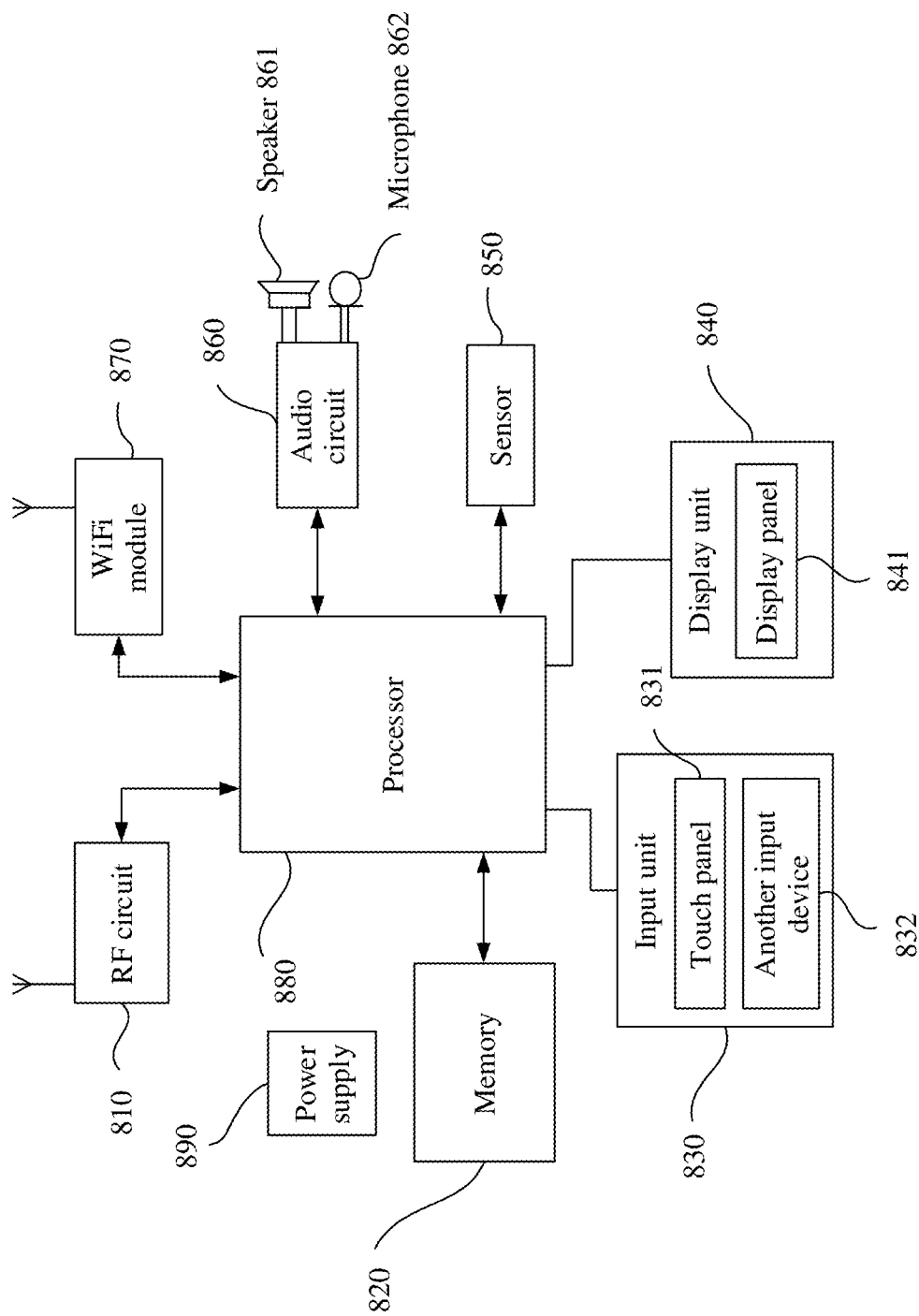
FIG. 8 is a schematic diagram of another embodiment of a measurement apparatus according to an embodiment of this application.

FIG. 8 is a schematic diagram of an embodiment of the measurement apparatus according to an embodiment of this application. As shown in FIG. 8, for ease of description, only parts related to this embodiment of this application are shown. For technical details that are not disclosed, refer to the method parts of the embodiments of this application. The measurement apparatus may be a terminal, or may be an integrated chip. The chip may be independent, or may be integrated into a terminal. This is not specifically limited herein. For example, the measurement apparatus is a mobile phone:

Referring to FIG. 8, the mobile phone includes: components such as a radio frequency (RF) circuit 810, a memory 820, an input unit 830, a display unit 840, a sensor 850, an audio circuit 860, a Wi-Fi module 870, a processor 880, and a power supply 890. A person skilled in the art may understand that a structure of the mobile phone shown in FIG. 8 does not constitute a limitation on the mobile phone, and the mobile phone may include more or fewer components than those shown in the figure, combine some components, or have different component arrangements.

The following specifically describes the components of the mobile phone with reference to FIG. 8.

The RF circuit 810 may be configured to receive and send information, or receive and send a signal in a call process; particularly, after receiving downlink information of a base station, send the downlink information to the processor 880 for processing; and in addition, send designed uplink data to the base station. Generally, the RF circuit 810 includes but is not limited to an antenna, at least one amplifier, a transceiver, a coupler, a low noise amplifier (LNA), a duplexer, and the like. In addition, the RF circuit 810 may further communicate with a network and another device through wireless communication. The wireless communication may use any communications standard or protocol, including but not limited to global system for mobile communications (GSM), general packet radio service (GPRS), code division multiple access (CDMA), wideband code division multiple access (WCDMA), long term evolution (LTE), email, short message service (SMS), and the like.

The memory 820 may be configured to store a software program and a module. The processor 880 performs various functional applications of the mobile phone and processes data by running the software program and the module stored in the memory 820. The memory 820 may mainly include a program storage area and a data storage area. The program storage area may store an operating system, an application program required by at least one function (such as a sound playing function or an image playing function), and the like. The data storage area may store data (such as audio data or an address book) created based on use of the mobile phone, and the like. In addition, the memory 820 may include a high-speed random access memory, and may further include a nonvolatile memory, for example, at least one magnetic disk storage device, a flash storage device, or another volatile solid-state storage device.

The input unit 830 may be configured to: receive entered number or character information, and generate a key signal input related to user setting and function control of the mobile phone. Specifically, the input unit 830 may include a touch panel 831 and another input device 832. The touch panel 831, also referred to as a touchscreen, may collect a touch operation (for example, an operation performed by a user on the touch panel 831 or near the touch panel 831 by using any proper object or accessory such as a finger or a stylus) of the user on or near the touch panel 831, and drive a corresponding connection apparatus based on a preset program. Optionally, the touch panel 831 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 880, and can receive and execute a command sent by the processor 880. In addition, the touch panel 831 may be implemented by using a plurality of types such as a resistive type, a capacitive type, an infrared ray, and a surface acoustic wave. In addition to the touch panel 831, the input unit 830 may include another input device 832. Specifically, other input devices 832 may include but are not limited to one or more of a physical keyboard, a function key (such as a volume control key or an on/off key), a trackball, a mouse, a joystick, and the like.

The display unit 840 may be configured to display information entered by the user or information provided for the user, and various menus of the mobile phone. The display unit 840 may include a display panel 841. Optionally, the display panel 841 may be configured in a form such as a liquid crystal display (LCD) or an organic light-emitting diode (OLED). Further, the touch panel 831 may cover the display panel 841. After detecting the touch operation on or near the touch panel 831, the touch panel 831 transmits the touch operation to the processor 880 to determine a type of a touch event. Then the processor 880 provides a corresponding visual output on the display panel 841 based on the type of the touch event. In FIG. 8, the touch control panel 831 and the display panel 841 are used as two independent components to implement input and output functions of the mobile phone. However, in some embodiments, the touch panel 831 and the display panel 841 may be integrated to implement the input and output functions of the mobile phone.

The mobile phone may further include at least one sensor 850 such as a light sensor, a motion sensor, or another sensor. Specifically, the light sensor may include an ambient light sensor and a proximity sensor. The ambient light sensor may adjust luminance of the display panel 841 based on brightness of ambient light. The proximity sensor may turn off the display panel 841 and/or backlight when the mobile phone moves to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone. Details are not described herein.

The audio circuit 860, a speaker 861, and a microphone 862 may provide an audio interface between the user and the mobile phone. The audio circuit 860 may convert received audio data into an electrical signal, and then transmit the electrical signal to the speaker 861, and the speaker 861 converts the electrical signal into a sound signal for output. In addition, the microphone 862 converts a collected sound signal into an electrical signal. The audio circuit 860 receives the electrical signal, converts the electrical signal into audio data, and then outputs the audio data to the processor 880 for processing. After the processing, the processor 880 sends the audio data to, for example, another mobile phone by using the RF circuit 810, or outputs the audio data to the memory 820 for further processing.

Wi-Fi is a short-distance radio transmission technology. With the Wi-Fi module 870, the mobile phone may help the user send and receive an email, browse a web page, access streaming media, and the like. The Wi-Fi module 870 provides wireless access to the broadband internet for the user. Although FIG. 8 shows the Wi-Fi module 870, it may be understood that the Wi-Fi module 870 is not a mandatory component of the mobile phone, and may definitely be omitted as required without changing the scope of the essence of the present invention.

As a control center of the mobile phone, the processor 880 connects various parts of the entire mobile phone by using various interfaces and lines, and performs various functions of the mobile phone and processes data by running or executing the software program and/or the module stored in the memory 820 and by invoking data stored in the memory 820, to perform overall monitoring on the mobile phone. Optionally, the processor 880 may include one or more processing units. Preferably, an application processor and a modem processor may be integrated into the processor 880. The application processor mainly processes an operating system, a user interface, and an application program. The modem processor mainly processes wireless communication. It may be understood that alternatively, the modem processor may not be integrated into the processor 880.

The mobile phone further includes the power supply 890 (such as a battery) that supplies power to each component. Preferably, the power supply may be logically connected to the processor 880 by using a power supply management system, to implement functions such as charging management, discharging management, and power consumption management by using the power supply management system.

Although not shown, the mobile phone may further include a camera, a Bluetooth module, and the like. Details are not described herein.

(1) In an embodiment of this application, the processor 880 included in the measurement apparatus further has the following functions:

determining an idle component carrier;

determining a RMTC measurement periodicity and a DMTC measurement periodicity of a first inter-frequency frequency for LAA;

if the RMTC measurement periodicity and the DMTC measurement periodicity of the first inter-frequency frequency share the same time point, separately performing RMTC measurement on the first inter-frequency frequency by using the idle component carrier to obtain a first measurement result, and performing DMTC measurement on the first inter-frequency frequency to obtain a second measurement result; and sending the first measurement result and the second measurement result to a network device, where the first measurement result and the second measurement result are used to indicate the network device to schedule a resource.

Optionally, in some implementations of this embodiment of this application, the first measurement result includes RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the second measurement result includes channel information, and the channel information is used to indicate the network device to determine scheduling data and a serving cell.

Optionally, in some implementations of this embodiment of this application, the first inter-frequency frequency carries a specific identifier, and the processor 880 further has the following functions:

when RRC configures inter-frequency DMTC measurement, if the configured first inter-frequency frequency is in a first RMTC measurement list, adding the specific identifier to the first inter-frequency frequency in the first RMTC measurement list; and when the RRC configures inter-frequency RMTC measurement, if the configured first inter-frequency frequency is in a first DMTC measurement list, adding the specific identifier to the first inter-frequency frequency in the first DMTC measurement list.

Optionally, in some implementations of this embodiment of this application, the first inter-frequency frequency carries the specific identifier, and the processor 880 further has the following functions:

when the RRC deconfigures the inter-frequency DMTC measurement, if the deconfigured first inter-frequency frequency is in the first RMTC measurement list, clearing the specific identifier from the first RMTC measurement list; and when the RRC deconfigures the inter-frequency RMTC measurement, if the deconfigured first inter-frequency frequency is in the first DMTC measurement list, clearing the specific identifier from the first DMTC measurement list.

(2) In an embodiment of this application, the processor 880 included in the measurement apparatus further has the following functions:

performing RMTC measurement on a second inter-frequency frequency to obtain a third measurement result, if a start time of a RMTC measurement periodicity of the second inter-frequency frequency for LAA falls within a gap;

performing DMTC measurement on the second inter-frequency frequency to obtain a fourth measurement result, if a start time of a DMTC measurement periodicity of the second inter-frequency frequency for the LAA falls within the gap; and sending the third measurement result and the fourth measurement result to a network device, where the third measurement result and the fourth measurement result are used to indicate the network device to schedule a resource.

Optionally, in some implementations of this embodiment of this application, the third measurement result includes RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the fourth measurement result includes channel information, and the channel information is used to indicate the network device to determine scheduling data and a serving cell.

Optionally, in some implementations of this embodiment of this application, the second inter-frequency frequency carries a specific identifier, and the processor 880 further has the following functions:

when RRC configures inter-frequency DMTC measurement, if the configured second inter-frequency frequency is in a second RMTC measurement list, adding the specific identifier to the second inter-frequency frequency in the second RMTC measurement list; and when the RRC configures inter-frequency RMTC measurement, if the configured second inter-frequency frequency is in a second DMTC measurement list, adding the specific identifier to the second inter-frequency frequency in the second DMTC measurement list.

Optionally, in some implementations of this embodiment of this application, the second inter-frequency frequency carries the specific identifier, and the processor 880 further has the following functions:

when the RRC deconfigures the inter-frequency DMTC measurement, if the deconfigured second inter-frequency frequency is in the second RMTC measurement list, clearing the specific identifier from the second RMTC measurement list; and when the RRC deconfigures the inter-frequency RMTC measurement, if the deconfigured second inter-frequency frequency is in the second DMTC measurement list, clearing the specific identifier from the second DMTC measurement list.

(3) In an embodiment of this application, the processor 880 included in the measurement apparatus further has the following functions:

determining a RMTC measurement periodicity and a DMTC measurement periodicity of a secondary cell intra-frequency frequency for LAA; if the RMTC measurement periodicity and the DMTC measurement periodicity of the secondary cell intra-frequency frequency share the same time point, performing RMTC measurement on the secondary cell intra-frequency frequency to obtain a fifth measurement result, and performing DMTC measurement on the secondary cell intra-frequency frequency, to obtain a sixth measurement result; and sending the fifth measurement result and the sixth measurement result to a network device, where the fifth measurement result and the sixth measurement result are used to indicate the network device to schedule a resource.

Optionally, in some implementations of this embodiment of this application, the fifth measurement result may include: RSSI information of an orthogonal frequency division multiplexing symbol in the RMTC measurement periodicity of the first inter-frequency frequency, where the RSSI information of the orthogonal frequency division multiplexing symbol is used to indicate, to the network device, whether the first inter-frequency frequency is occupied; and the sixth measurement result may include channel information, and the channel information is used to indicate the network device to determine scheduling data and a serving cell.

Optionally, in some implementations of this embodiment of this application, the intra-frequency frequency carries a specific identifier, and the processor 880 further has the following functions:

when RRC configures secondary cell intra-frequency DMTC measurement, if the configured intra-frequency frequency is in a third RMTC measurement list, adding the specific identifier to the intra-frequency frequency in the third RMTC measurement list; and when the RRC configures intra-frequency RMTC measurement, if the configured intra-frequency frequency is in a third DMTC measurement list, adding, by the measurement apparatus, the specific identifier to the intra-frequency frequency in the third DMTC measurement list.

Optionally, in some implementations of this embodiment of this application, the intra-frequency frequency carries the specific identifier, and the processor 880 further has the following functions:

when the RRC deconfigures the intra-frequency DMTC measurement, if the deconfigured intra-frequency frequency is in the third RMTC measurement list, clearing the specific identifier from the third RMTC measurement list; and when the RRC deconfigures the intra-frequency RMTC measurement, if the deconfigured intra-frequency frequency is in the third DMTC measurement list, clearing the specific identifier from the third DMTC measurement list.

An embodiment of this application further provides a chip, and the chip may include:

one or more processors;

a memory; and one or more programs, where the one or more programs are stored in the memory, the one or more programs include an instruction, and when the instruction is executed by the chip, the chip is enabled to perform the method in any one of the embodiments shown in FIG. 2, FIG. 3, and FIG. 4, or the foregoing other embodiments. Details are not described herein again.

All or some of the foregoing embodiments may be implemented by using software, hardware, firmware, or any combination thereof. When software is used to implement the embodiments, the embodiments may be implemented or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division may be provided as merely a logical function division and another division may be provided in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A measurement method, comprising:

determining an idle component carrier;

determining a received signal strength indicator measurement timing configuration (RMTC) measurement periodicity and a discovery signals measurement timing configuration (DMTC) measurement periodicity of a first inter-frequency frequency for licensed assisted access (LAA);

when the RMTC measurement periodicity and the DMTC measurement periodicity of the first inter-frequency frequency share a same time point, separately performing RMTC measurement on the first inter-frequency frequency by using the idle component carrier to obtain a first measurement result, and performing DMTC measurement on the first inter-frequency frequency to obtain a second measurement result; and sending the first measurement result and the second measurement result to a network device, wherein the first measurement result and the second measurement result are used to indicate the network device to schedule a resource, wherein:

the first measurement result comprises received signal strength indication information of an orthogonal frequency division multiplexing symbol in the RMTC measurement periodicity of the first inter-frequency frequency, wherein the received signal strength indication information of the orthogonal frequency division multiplexing symbol is used to indicate, to the network device, whether the first inter-frequency frequency is occupied; and the second measurement result comprises channel information, and the channel information is used to indicate the network device to determine scheduling data and a serving cell.

2. The method according to claim 1, wherein the first inter-frequency frequency carries a specific identifier, and before a step of determining the idle component carrier, the method further comprises:

when radio resource control (RRC) configures inter-frequency DMTC measurement, if the configured first inter-frequency frequency is in a first RMTC measurement list, adding the specific identifier to the first inter-frequency frequency in the first RMTC measurement list; and when the RRC configures inter-frequency RMTC measurement, if the configured first inter-frequency frequency is in a first DMTC measurement list, adding the specific identifier to the first inter-frequency frequency in the first DMTC measurement list.

3. The method according to claim 1, wherein the first inter-frequency frequency carries a specific identifier, and after a step of sending the first measurement result and the second measurement result to the network device, the method further comprises:

when radio resource control (RRC) deconfigures the inter-frequency DMTC measurement, if the deconfigured first inter-frequency frequency is in a first RMTC measurement list, clearing the specific identifier from the first RMTC measurement list; and when the RRC deconfigures the inter-frequency RMTC measurement, if the deconfigured first inter-frequency frequency is in a first DMTC measurement list, clearing the specific identifier from the first DMTC measurement list.

4. The measurement method according to claim 1, comprising:

performing received signal strength indicator measurement timing configuration (RMTC) measurement on a second inter-frequency frequency to obtain a third measurement result, when a start time of a RMTC measurement periodicity of the second inter-frequency frequency for licensed assisted access (LAA) falls within a gap;

performing discovery signals measurement timing configuration (DMTC) measurement on the second inter-frequency frequency to obtain a fourth measurement result, when a start time of a DMTC measurement periodicity of the second inter-frequency frequency for the LAA falls within the gap; and sending the third measurement result and the fourth measurement result to a network device, wherein the third measurement result and the fourth measurement result are used to indicate the network device to schedule a resource.

5. The method according to claim 4, wherein the third measurement result comprises received signal strength indication information of an orthogonal frequency division multiplexing symbol in the RMTC measurement periodicity of the second inter-frequency frequency, wherein the received signal strength indication information of the orthogonal frequency division multiplexing symbol is used to indicate, to the network device, whether the second inter-frequency frequency is occupied; and the fourth measurement result comprises channel information, and the channel information is used to indicate the network device to determine scheduling data and a serving cell.

6. The method according to claim 4, wherein the second inter-frequency frequency carries a specific identifier, and before a step of performing RMTC measurement on the second inter-frequency frequency, when the start time of the RMTC measurement periodicity of the second inter-frequency frequency for LAA falls within the gap, the method further comprises:

when radio resource control (RRC) configures inter-frequency DMTC measurement, if the configured second inter-frequency frequency is in a second RMTC measurement list, adding the specific identifier to the second inter-frequency frequency in the second RMTC measurement list; and when the RRC configures inter-frequency RMTC measurement, if the configured second inter-frequency frequency is in a second DMTC measurement list, adding the specific identifier to the second inter-frequency frequency in the second DMTC measurement list.

7. The method according to claim 4, wherein the second inter-frequency frequency carries a specific identifier, and after a step of sending the third measurement result and the fourth measurement result to the network device, the method further comprises:

when radio resource control (RRC) deconfigures the inter-frequency DMTC measurement, if the deconfigured second inter-frequency frequency is in a second RMTC measurement list, clearing the specific identifier from the second RMTC measurement list; and when the RRC deconfigures the inter-frequency RMTC measurement, if the deconfigured second inter-frequency frequency is in the second DMTC measurement list, clearing the specific identifier from the second DMTC measurement list.

8. A measurement apparatus, comprising:

a memory, configured to store a program; and a processor, configured to execute the program stored in the memory, wherein when the program is executed, the processor is configured to perform steps comprising:

determining an idle component carrier;

determining a received signal strength indicator measurement timing configuration (RMTC) measurement periodicity and a discovery signals measurement timing configuration (DMTC) measurement periodicity of a first inter-frequency frequency for licensed assisted access (LAA);

when the RMTC measurement periodicity and the DMTC measurement periodicity of the first inter-frequency frequency share a same time point, separately performing RMTC measurement on the first inter-frequency frequency by using the idle component carrier to obtain a first measurement result, and performing DMTC measurement on the first inter-frequency frequency to obtain a second measurement result; and sending the first measurement result and the second measurement result to a network device, wherein the first measurement result and the second measurement result are used to indicate the network device to schedule a resource, wherein:

the first measurement result comprises received signal strength indication information of an orthogonal frequency division multiplexing symbol in the RMTC measurement periodicity of the first inter-frequency frequency, wherein the received signal strength indication information of the orthogonal frequency division multiplexing symbol is used to indicate, to the network device, whether the first inter-frequency frequency is occupied; and the second measurement result comprises channel information, and the channel information is used to indicate the network device to determine scheduling data and a serving cell.

9. The measurement apparatus according to claim 8, wherein the first inter-frequency frequency carries a specific identifier, and the steps further comprise:

when radio resource control (RRC) configures inter-frequency DMTC measurement, if the configured first inter-frequency frequency is in a first RMTC measurement list, adding the specific identifier to the first inter-frequency frequency in the first RMTC measurement list; and when the RRC configures inter-frequency RMTC measurement, if the configured first inter-frequency frequency is in a first DMTC measurement list, adding the specific identifier to the first inter-frequency frequency in the first DMTC measurement list.

10. The measurement apparatus according to claim 8, wherein the first inter-frequency frequency carries a specific identifier, and after a step of sending the first measurement result and the second measurement result to the network device, the steps further comprise:

when radio resource control (RRC) deconfigures inter-frequency DMTC measurement, if the deconfigured first inter-frequency frequency is in a first RMTC measurement list, clearing the specific identifier from the first RMTC measurement list; and when the RRC deconfigures inter-frequency RMTC measurement, if the deconfigured first inter-frequency frequency is in a first DMTC measurement list, clearing the specific identifier from the first DMTC measurement list.

* * * * *